(12) United States Patent
Wentz et al.

(10) Patent No.: US 11,593,488 B2
(45) Date of Patent: Feb. 28, 2023

(54) SYSTEMS AND METHODS FOR A CRYPTOGRAPHIC AGILE BOOTLOADER FOR UPGRADABLE SECURE ENVIRONMENT

(71) Applicant: Ares Technologies, Inc., Boston, MA (US)

(72) Inventors: Christian Wentz, San Francisco, CA (US); Ilia Lebedev, Cambridge, MA (US); Anna Lysyanskaya, Providence, RI (US)

(73) Assignee: Ares Technologies, Inc., Boston, MA (US)

( * ) Notice: Subject to any disclaimer, the term of this patent is extended or adjusted under 35 U.S.C. 154(b) by 0 days.

(21) Appl. No.: 17/513,059

(22) Filed: Oct. 28, 2021

(65) Prior Publication Data
US 2022/0198018 A1   Jun. 23, 2022

Related U.S. Application Data

(60) Provisional application No. 63/106,661, filed on Oct. 28, 2020.

(51) Int. Cl.
*G06F 21/57* (2013.01)
*H04L 9/32* (2006.01)

(52) U.S. Cl.
CPC .......... *G06F 21/572* (2013.01); *H04L 9/3247* (2013.01); *H04L 9/3268* (2013.01); *G06F 2221/033* (2013.01)

(58) Field of Classification Search
CPC ............. G06F 21/572; G06F 2221/033; H04L 9/3247; H04L 9/3268
See application file for complete search history.

(56) References Cited

U.S. PATENT DOCUMENTS

| | | | |
|---|---|---|---|
| 8,443,203 B2 * | 5/2013 | Park | G06F 21/575 |
| | | | 713/187 |
| 9,363,087 B2 | 6/2016 | Hawblitzel et al. | |

(Continued)

FOREIGN PATENT DOCUMENTS

| | | | | |
|---|---|---|---|---|
| EP | 3458999 A1 * | 3/2019 | | G06F 21/572 |
| WO | 2018150154 | 8/2018 | | |

(Continued)

OTHER PUBLICATIONS

"Crypto-Bootloader (CryptoBSL)"—Texas Instruments, Nov. 2015 https://www.ti.com/lit/ug/slau657/slau657.pdf?ts=1666299190616 &ref_url=https%253A%252F%252Fwww.google.com%252F (Year: 2015).*

(Continued)

*Primary Examiner* — Randy A Scott
(74) *Attorney, Agent, or Firm* — Caldwell Intellectual Property Law

(57) ABSTRACT

A system for a cryptographic agile bootloader for upgradable secure computing environment, the cryptographic agile bootloader comprising a computing device associated with a first bootloader is presented. The computing device includes a secure root of trust, the secure root of trust configured to produce a first secret and a second secret and a processor. The processor is configured to load a second bootloader, wherein the second bootloader is configured to generate a secret-specific public datum as a function of the second secret, wherein the secret-specific public datum further comprises a bootloader measurement, load a first bootloader, wherein the first bootloader is configured to sign the secret-specific public datum as a function of the first secret, and replace the first bootloader with the second bootloader.

20 Claims, 8 Drawing Sheets

(56) References Cited

U.S. PATENT DOCUMENTS

| | | |
|---|---|---|
| 9,467,292 B2 | 10/2016 | Nahari |
| 9,935,773 B2 | 4/2018 | Sarangdhar et al. |
| 10,397,005 B2 | 8/2019 | Brickell |
| 2009/0019275 A1* | 1/2009 | Park .................. G06F 21/575 |
| | | 726/2 |
| 2019/0020647 A1 | 1/2019 | Sinha et al. |
| 2019/0109874 A1 | 4/2019 | Samuel et al. |
| 2019/0116038 A1 | 4/2019 | Sprague |
| 2019/0229919 A1 | 7/2019 | Gurkan et al. |
| 2019/0312734 A1 | 10/2019 | Wentz et al. |

FOREIGN PATENT DOCUMENTS

| | | |
|---|---|---|
| WO | 2019043360 | 3/2019 |
| WO | 2019125766 | 6/2019 |
| WO | WO-2021064039 A1 * | 4/2021 |

OTHER PUBLICATIONS

"AN0060: Bootloader with AES Encryption Rev. 1.05"—Silicon Labs, Nov. 2, 2016 https://www.silabs.com/documents/public/application-notes/an0060-bootloader-with-aes-encryption.pdf (Year: 2016).*

* cited by examiner

SYSTEMS AND METHODS FOR A CRYPTOGRAPHIC AGILE BOOTLOADER FOR UPGRADABLE SECURE ENVIRONMENT

CROSS-REFERENCE TO RELATED APPLICATIONS

This application claims the benefit of priority of U.S. Provisional Patent Application Ser. No. 63/106,661 filed on Oct. 28, 2020, and entitled "CRYPTOGRAPHICALLY UPGRADABLE SECURE ENVIRONMENT," the entirety of which is incorporated herein by reference.

STATEMENT REGARDING FEDERALLY SPONSORED RESEARCH OR DEVELOPMENT

This invention was made with Government support under Contract Number: HR001121C0115 awarded by Defense Advanced Research Projects Agency (DARPA). The Government has certain rights in the invention.

FIELD OF THE INVENTION

The present invention generally relates to the field of cryptography. In particular, the present invention is directed to systems and methods for a cryptographic agile bootloader for upgradable secure computing environment.

BACKGROUND

It is abundantly clear at the time of this writing that no single standard for a post-quantum signature scheme, nor key exchange has emerged as one that will maintain relevance for the next 10 years. This puts currently designed systems at a disadvantage, as it is difficult to predict the nature of future needed upgrades.

SUMMARY OF THE DISCLOSURE

In an aspect, a cryptographic agile bootloader for upgradable secure computing environment, the cryptographic agile bootloader comprising a computing device associated with a first bootloader is presented. The computing device includes a secure root of trust, the secure root of trust configured to produce a first secret and a second secret and a processor. The processor is configured to load a second bootloader, wherein the second bootloader is configured to generate a secret-specific public datum as a function of the second secret, wherein the secret-specific public datum further comprises a bootloader measurement, load a first bootloader, wherein the first bootloader is configured to sign the secret-specific public datum as a function of the first secret, and replace the first bootloader with the second bootloader.

In another aspect, a method for a cryptographic agile bootloader for upgradable secure computing environment of computing device associated with a first bootloader is presented. The method includes producing, by a secure root of trust, a first secret and a second secret, loading, by a processor, a second bootloader, generating, by the second bootloader, a secret-specific public datum as a function of the second secret, wherein the secret-specific public datum further comprises a bootloader measurement, loading, by the processor, a first bootloader, signing, by the first bootloader, the secret-specific public datum as a function of the first secret, and replacing the first bootloader with the second bootloader.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
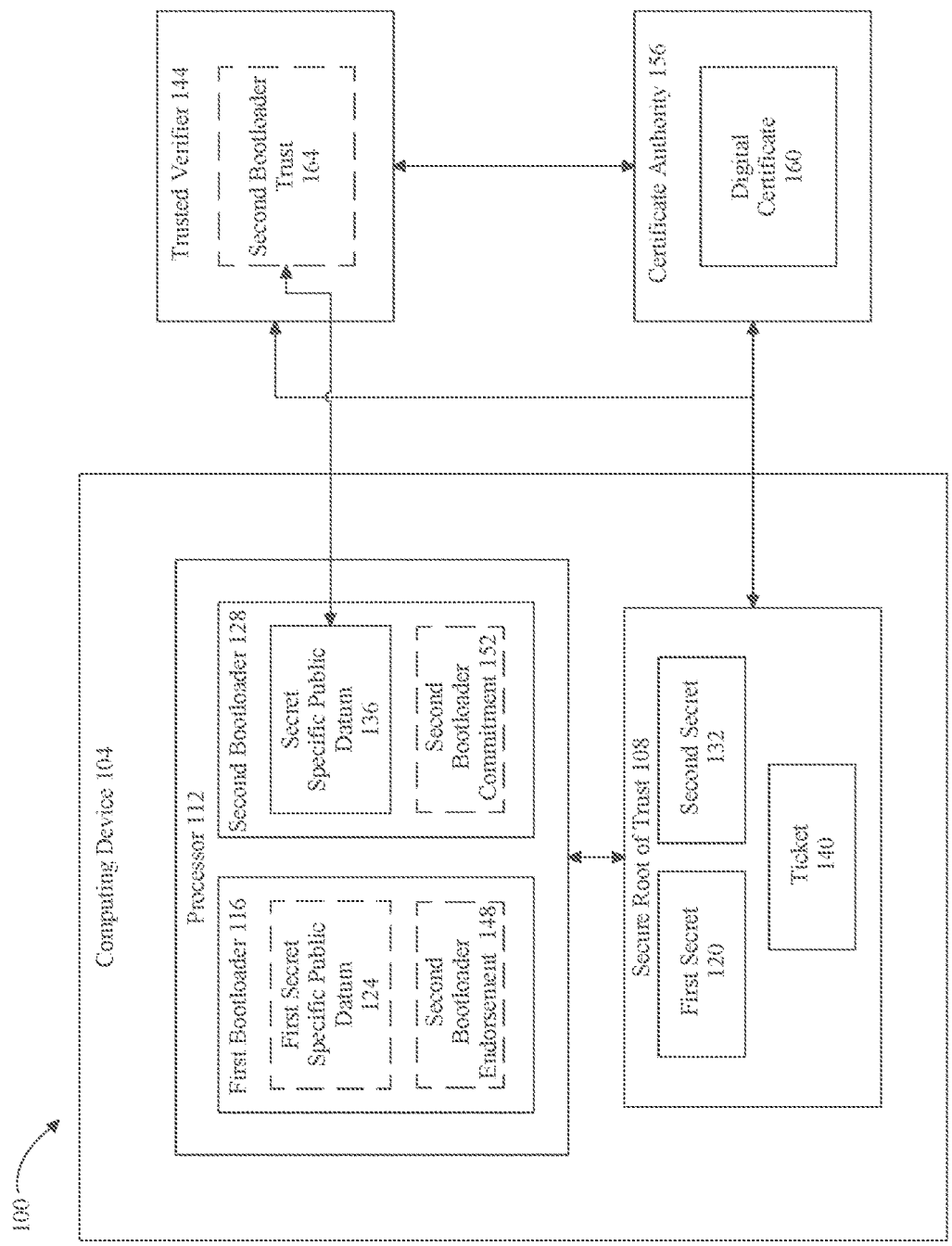
FIG. 1 is a block diagram illustrating an exemplary embodiment of a system for a cryptographic agile bootloader for upgradable secure computing environment.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a cryptographic agile bootloader for upgradable secure computing environment. Aspects of the present disclosure may include a construction that achieves field upgrades of the bootloader without needing to put it in a trusted setting. Aspects of the present disclosure may also guarantee that the upgrade has taken place correctly, even in the presence of a network/software that can corrupt the new bootloader image. In an embodiment, aspects of the present disclosure may include switching between specification within protocols, such as from one bootloader using RSA key size 1 to another bootloader using RSA key size 2. Alternatively, switching may include executing distinct protocols. In an embodiment, digital signatures based on zero knowledge proofs may be used to replace digital signatures based on public key cryptography. Aspects of the present disclosure may use a device-specific secret, root of trust (ROT), and/or known measurement of as second bootloader (BL_2) to bootstrap trust from a first bootloader (BL_1) to BL_2. A manufacturer of the computing device may know the public key of the BL_1 (pk_1), so BL_1 can sign a blob and the manufacturer can check that it was actually BL_1 on a specific device that saw the blob.

Second, if BL_2 runs and provides its measurement and the public key of BL_2 (pk_2), the system of the present disclosure can authenticate those with the bootloader-specific device secret.

Aspects of the present disclosure may include a root of trust with a BL_1 that uses a cryptography standard to take the bootloader-specific device key and turn it into a public key (pk_1) and secret key (sk_1). Aspects of the present disclosure may include the manufacturer that has already certified pk_1. In a non-limiting embodiment, aspects of the present disclosure may replace BL_1 with BL_2, using a completely different cryptography standard. In an embodiment, the current bootloader combines the ROT with a BL that uses RSA for signatures, all of which are baked into hardware. Aspects of the present disclosure may include configuring the ROT in hardware and a BL that's in software. Exemplary embodiments illustrating aspects of the present disclosure are described below in the context of several specific examples.

In an embodiment, the present disclosure may include a protocol. The protocol may be configured to save a logical proof and/or secure proof of the protocol, which a setup described below. The ROT may be hard-coded, for instance and without limitation by inclusion in a read-only memory (ROM). "BL_1," for the purposes of this disclosure, represents a first or pre-existing bootloader. In a non-limiting embodiment, BL_1 may be an outdated bootloader the computing device is trying to replace. For the purpose of this disclosure, "BL_2" represents a second bootloader and/or a bootloader to be switched to according to protocols described in this disclosure. "pk_1" and "sk_1" may represent, respectively, public and private keys associated with BL_1. "pk_2" and "sk_2" may represent, respectively, public and private keys associated with BL_2. In a non-limiting embodiment, SW may represent all untrusted software running on top of the bootloaders. SW may include, without limitation, enclaves, system operators, untrusted networks, etc. A manufacturer may act as a certificate authority, and/or as an entity that issues certificates. "H(x)," as used in this disclosure refers to a hash of a message or block of data denoted as x. "MAC(s, m)," as used in this disclosure, refers to a message authentication code, where s is a secret and m is a message; his may be instantiated, without limitation, using Hash-based Message Authentication Code (HMAC), KECCAK Message Authentication Code KMAC, or any other protocol that may occur to persons skilled in the art upon reviewing the entirety of this disclosure. "KDF(s, m)," as used in this disclosure, refers to a key-derivation function that uses s as a secret and m as an auxiliary message for domain separation. A KDF may be built from a pseudorandom function (PRF) such as HMAC or KMAC. "sig_y(x)," as used herein denotes a public-key signature of x with secret key y. "k_D," as used herein, is a device secret; after using it, an ROT may erase it from memory and/or active memory as described in further detail below. k_1 and k_2 may refer to one-way functions of k_D made by an ROT for BL_1 and BL_2, respectively. k_BL may be made by KDF(k_D, H(BL)). BL_1 and BL_2 may be responsible for erasing k_1 and k_2 so that each bootloader-specific device secret is known only to a corresponding specific bootloader. In a non-limiting embodiment, a manufacturer may have already certified pk_1 in a trusted setting. For instance, a manufacturer may know that pk_1 came from an authentic BL_1 running on a certain device. In another non-limiting embodiment, a manufacturer may know an expected/honest H(BL_1) and H(BL_2). Aspects of the present disclosure may include a secure proof that the manufacturer certifies pk_2 if and only if it came from an authentic BL_2 running on the same device as BL_1.

In an embodiment, aspects of the present disclosure may include a future-facing system that will allow for some agility in its selection of cryptographic primitives. In a non-limiting embodiment, deprecating weak or unpopular cryptography and implementing primitives suited for a given application's threat model and longevity. Unfortunately, this consideration is somewhat at odds with secure boot as is practiced today, as it typically relies on a narrow functional interface to long-lived signing keys to serve as a device's unique cryptographic identity. This approach typically employs a strong RSA key pair today, but this is not robust in the face of a quantum adversary. Simply adopting more appropriate primitives (e.g. FALCON for a device's permanent cryptographic identity) is also problematic, as it assumes these primitives will remain relevant and viable for the stated 10 years. Embodiments described herein function as an alternative to selecting a single cryptosystem, by including a root of trust, which may function as a secure first stage bootloader that relies only on well-understood quantum-resistant symmetric cryptography such as a cryptographic hash function and HMAC. This first stage bootloader may securely load and produce a unique the key seed for a secure second-stage bootloader with relevant public key cryptography.

Aspects of the present disclosure may perform or implement one or more aspects of a cryptographic system. In one embodiment, a cryptographic system is a system that converts data from a first form, known as plaintext. As used in this disclosure, "plaintext" is an intelligible piece of data when viewed in its intended format, into a second form, known as ciphertext. As used in this disclosure, "ciphertext" is not intelligible data when viewed in the same way. In a non-limiting embodiment, ciphertext may be unintelligible in any format unless first converted back to plaintext. In one embodiment, a process of converting plaintext into ciphertext is known as encryption. As used in this disclosure, "encryption," is a process that involve the use of a datum, known as an "encryption key," to alter plaintext. Cryptographic system may also convert ciphertext back into plaintext, which is a process known as "decryption." As described in this disclosure, "decryption" is a process that involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Aspects of the present disclosure may include a threat model to be aware of The threat model may include: (1) all custodies of trust in the below diagram are from the manufacturer's point of view. (2) The manufacturer is trusted as it is the one that verifies hashes and certificates signed by BL_1. (3) The ROT is trusted because it authenticates the communication channel between BL_2 and BL_1. (4) SW is completely untrusted. (5) BL_1 and BL_2 are trusted but verified binaries. (6) Assume that at the time of bootloader change, the original signature scheme used by BL_1 (e.g., RSA) is still secure. Towards the end of the device lifespan, RSA could be broken, so an attacker could reverse engineer pk_1 to get ski and possibly k_1. However, it is assumed that hash functions are untampered, so the attacker is unable to go from k_1 back to k (by the device's end-of-life, BL_1's certificate is to be revoked).

In embodiments of cryptographic systems that are "asymmetric," either encryption or decryption key cannot be readily deduced without additional secret knowledge, even given the possession of a corresponding decryption or encryption key, respectively. For example and without limitation, a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Aspects of the present disclosure may produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a hashing algorithm. A "hashing algorithm," for the purpose of this disclosure, is a repeatable process wherein identical lots of data may produce identical hashes each time they are subjected to a particular hashing algorithm. in a non-limiting embodiment, as hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm. For instance and without limitation, it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an avalanche effect. An "avalanche effect," for the purpose of this disclosure, is ab extremely small set of changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche and/or cascade effect may be evinced by various hashing processes in which persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard, etc., In a non-limiting embodiment, further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits. This may be so, at least in part, the hash function may take on the order of $2^{256}$ operations to locate a collision in a 512-bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Systems and methods described herein may use and/or implement one or more secure proofs. A "secure proof," as used in this disclosure, is a protocol whereby an output is generated that demonstrates possession of a secret, such as device-specific secret, without demonstrating the entirety of the device-specific secret. In a non-limiting embodiment, the secure proof by itself, may be insufficient to reconstruct the entire device-specific secret, enabling the production of at least another secure proof using at least a device-specific secret. In another non-limiting embodiment, the secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets. For example and without limitation, the secure proof may be a response contained in one challenge-response pair. In an embodiment, the secure proof may not be secure. Alternatively or additionally, the secure proof may include a one-time revelation of at least a device-specific secret, for instance as used in a single challenge-response exchange.

In an embodiment, the secure proof may include a zero-knowledge proof, which may provide an output demonstrating possession of a secret while revealing none of the secret to a recipient of the output. For example and without limitation, zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party. For example and without limitation, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate. In a non-limiting embodiment, verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively or additionally, zero-knowledge proof may include a non-interactive zero-knowledge, proof, or a proof wherein neither party to the proof interacts with the other party to the proof. For example and without limitation, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key. For example and without limitation, public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup. This may be so, at least in part, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points. In a non-limiting embodiment, verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Aspects of the present disclosure may include implementing a secure proof using a challenge-response protocol. In an embodiment, this may function as a one-time pad implementation. For example and without limitation, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets. In a non-limiting embodiment, the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system. For example and without limitation, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Aspects of the present disclosure may implement digital signatures. A "digital signature," as used herein, includes a secure proof of possession of a secret by a signing device, as performed on provided element of data, known as a message. A "message," for the purpose of this disclosure, is an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof. For example and without limitation, where secure proof is enacted by encrypting message using a private key of a public key cryptographic system, verification may include decrypting the encrypted message using the corresponding public key and comparing the decrypted representation to a purported match that was not encrypted. In a non-limiting embodiment, if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature. In a non-limiting embodiment, the mathematical representation may be produced using an alteration-sensitive, reliably reproducible algorithm, such as a hashing algorithm as described above. A mathematical representation to which the signature may be compared may be included with signature, for verification purposes. In other embodiments, the algorithm used to produce the mathematical representation may be publicly available, permitting the easy reproduction of the mathematical representation corresponding to any file.

Referring now to FIG. 1, an exemplary embodiment of a system 100 for a cryptographic agile bootloader for upgradable secure computing environment is illustrated. System includes a computing device 104. computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 104 may include a single computing device operating independently, or may include two or more computing device operating in concert, in parallel, sequentially or the like. In a non-limiting embodiment, two or more computing devices may be included together in a single computing device or in two or more computing devices. computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 104 may include but is not limited to, for example, a computing device or cluster of computing devices in a first location and a second computing device or cluster of computing devices in a second location. computing device 104 may include one or more computing devices dedicated to data storage, security, distribution of traffic for load balancing, and the like. computing device 104 may distribute one or more computing tasks as described below across a plurality of computing devices of computing device, which may operate in parallel, in series, redundantly, or in any other manner used for distribution of tasks or memory between computing devices. computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved. In a non-limiting embodiment, repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like. In a non-limiting embodiment, division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, In a non-limiting embodiment, system 100 includes a secure root of trust 108. A "secure root of trust," for the purpose of this disclosure, is a module such as a program and/or digital circuit design that is baked into the hardware of the computing device and initializes the machine and runs a subsequent bootloader. Secure root of trust 108 may be stored at least in part in read-only memory (ROM), instantiated at least in part as a hardware circuit such as a field-programmable gate array (FPGA), application-specific integrated circuit (ASIC), or the like thereof. In a non-limiting embodiment, secure root of trust 108 may be configured to produce a first secret 120 and a second secret 132. A "first secret," for the purpose of this disclosure, is a device-specific secret that includes any number denoting a first bootloader. A "second secret," as used in this disclosure, is a device-specific secret that includes any number denoting a second bootloader. First secret 120 may be exclusively available to only first bootloader 116 and secure root of trust 108. Second secret 132 may be exclusively available to only second bootloader 128 and secure root of trust 108. In a non-limiting embodiment, secure root of trust 108 may include a plurality of device-specific secrets wherein each secret is known only to secure root of trust 108 and to an associated bootloader. A "device-specific secret," for the purpose of this disclosure, is a device key or per-device secret that is stored in hardware and/or read-only memory of a device. Each device-specific secret may be unique to a single device and/or a lot of devices. Device-specific secrets may be known to a trusted verifier, a certificate authority, and/or a manufacturer. Computing device and/or root of trust may be able to generate a plurality of secrets, each of which may be assigned to a new bootloader. Methods of upgrading from one bootloader to the next as described in this disclosure may be repeated, iteratively upgrading to any number of new bootloaders according to processes described in this disclosure. Alternatively or additionally secure root of trust 108 may use the device-specific secret to decrypt any encrypted message, which may denote an identification of second bootloader 128. Persons skilled in the art, upon reviewing the entirety of this disclosure, will be aware of verifying messages in the context of encryption and decryption.

Still referring to FIG. 1, alternatively or additionally, secure root of trust 108 may not have a public cryptographic identity itself. In a non-limiting embodiment, a manufacturer may certify an "initial" identity: a public key deterministically derived by a factory-provided "reference" second-stage bootloader, for instance and without limitation as implemented for a pre-quantum RSA second-stage bootloader. In some embodiment, the device-specific secret may include the private key of any bootloader as described herein. Alternatively or additionally, the device-specific secret may be used by secure root of trust 108 to derive a unique key seed for first bootloader 116. In a non-limiting embodiment, secure root of trust and/or computing device may sign first bootloader 116 as a function of the device-specific secrets; this may be implemented in any way that may occur to a person skilled in the art upon reviewing the entirety of this disclosure, including without limitation any form of digital signature using any form of key as described in this disclosure. In a non-limiting embodiment, secure root of trust 108 may be configured to sign first bootloader 116 using the device-specific secret, wherein the device-specific secret is first secret 120. A factory may supply a trusted binary, and in a trusted setting may boot computing device 104 and/or secure root of trust 108 to read out its public key. Key derivation may only happen once. For instance and without limitation, computing device 104 and/or secure root of trust 108 may store an encrypted key pair (via AES-256) in untrusted storage, and derive a symmetric key from its unique the key seed provided by the root of trust. Alternatively or additionally, key generation may occur at boot time. Alternatively or additionally, the key seed may be consistent with a device-specific secret. In a non-limiting embodiment, whenever a secret produced by secure root of trust 108 is used, secure root of trust 108 may erase that secret from memory. Persons skilled in the art, upon reviewing the entirety of this disclosure, will be aware of the various embodiments of a root of trust for purposes as described herein. Secure root of trust 108 may perform enforcement of keyed access to boot code, such as code of a first bootloader and/or second bootloader as described in further detail below. In another instance and without limitation, the PUF may be consistent with the PUF in U.S. Nonprovisional application Ser. No. 16/682,371, and entitled "METHODS AND SYSTEMS FOR ANONYMOUS HARDWARE ATTESTATION," the entirety of which is incorporated by reference in this disclosure.

As used herein, a secure root of trust 108 is a hardware or software element configured to perform one or more secured operations beyond the control of other circuit elements or software, whether incorporated with the secure root of trust 108 in a circuit or computing device, or a part of an extrinsic computing device. As a result, at least one secured operation performed by secure root of trust 108 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure root of trust 108 and/or a system or computing device incorporating secure root of trust 108 based on the above-described set of assumptions. As a non-limiting, example, a secure root of trust 108 designed to produce an expected result despite all software-only attacks may give rise to a first confidence level, whereas another secure root of trust 108 designed to produce its expected result in the face of all software or hardware attacks may give rise to a second confidence level; the second confidence level may be higher, owing to the reduced probability that the second secure root of trust 108 would be compromised.

Still viewing FIG. 1, secure root of trust 108 may include a trusted platform module (TPM). In an embodiment, a TPM may include a hardware module, which may be an integrated circuit, an optoelectronic circuit, a section of an integrated circuit on the same die as a processor, an integrated circuit packaged with other die in a multi-chip module or other multi-die integration method, or printed circuit board product; TPM may have any suitable elements of digital or analog circuitry usable to perform one or more processes as described herein, including without limitation processes used to determine confidence levels and/or authenticate digitally signed assertions as described below. TPM may have memory and/or other logic and/or a processor in its own right which may be in a non-limiting example a crypto processor. TPM may have a hard-coded process, e.g. via protected ROM or secure flash, for signing a digital signature, which may be performed using any digital signature and/or digital signature protocol described in this disclosure, including without limitation using a private key, which may be associated with a public key, and/or a class of public keys, and/or may be a private key of a symmetric cryptographic system. TPM may be configured to incorporate a secure enclave and/or protocols for performing attestation on behalf of an untrusted or less trusted hardware or software element, e.g. TPM may be configured to have attestation requests from such a less trusted element relayed to it for secure signing, and may include packaging of signed data for use in an attestation protocol, representative embodiments of which are included in this disclosure. For instance, and without limitation, TPM may sign enclave attestations; as a non-limiting example, an enclave such as an SGX enclave or the like may be attested to using long-lived security of device keys inside the TPM. This private key and/or signing process may be performed using any digital signature and/or digital signing protocol described in this disclosure. For instance, and without limitation, a private key, signature, and/or signing process may be produced using a genuinely random process during manufacturing and/or at a later stage, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be determined and/or extracted using PUF processes, for instance and without limitation using a fuzzy extractor, key extractor physically unclonable function, and/or other software techniques. Private key extraction may utilize additional corrective measures, including as a non-limiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices.

Still referring to FIG. 1, secure root of trust 108 may include without limitation a trusted platform module (TPM), Platform Controller Hub, Baseboard Management Controller (BMC), Northbridge, Southbridge, silicon root of trust such as OpenTitan as promulgated by the LowRISC Foundation of Cambridge, UK, Titan chip as promulgated by Google of Mountain View, Calif., USA, Azure Sphere MCU and/or Microsoft Pluton as promulgated by Microsoft of Redmond, Wash., USA, ARM TrustZone as promulgated by ARM holdings of Cambridge, UK, iLO subsystem as promulgated by Hewlett Packard Enterprise of San Jose, Calif., or other component In a non-limiting embodiment, and still referring to FIG. 1, secure root of trust 108 may include a physically unclonable function (PUF). PUF may be implemented by various means. In an embodiment, PUF includes one or more non-intrinsic PUFs. Non-intrinsic PUFs may include without limitation optics based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photodiodes (APDs), single photon avalanche diodes (SPADs), silicon photomultipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 1 non-intrinsic PUF may include without limitation a radio frequency (RF)-based PUF. A radiofrequency PUF may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, non-intrinsic PUF may include one or more electronics based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, PUF may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 1, PUF may include a circuit producing a PUF via cross-coupled logical or analog circuit elements. As a non-limiting example, static random-access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF in an embodiment include without limitation buskeeper PUFs, which may be similar to other PUFs based on bistable memory elements but leveraging buskeeper cells. PUF may also combine two or more PUF designs, for instance a bistable ring PUF, which may be a hybrid of a ring oscillator PUF and a SRAM PUF, wherein the structure is similar to the ring oscillator PUF, but the number of inverting elements is even. This may mean that the loop does not oscillate but is bistable (like the SRAM PUF). Using reset logic, the bistable ring may destabilize and subsequently stabilize into a state that is set by the random silicon manufacturing variations.

In an embodiment, and still viewing FIG. 1, PUF may include a circuit implementing a quantum PUF. A quantum PUF, as used herein, is a PUF that generates secrets, such as random numbers, that are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-atom dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AlAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUF response due to local variations in temperature and magnetic field; such changes would be unknown to an attacker and may enable the production of multiple unique IDs based on such fluctuations, in a manner unpredictable even to the manufacturer.

With continued reference to FIG. 1, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator 204a-b. A number of dots in a device such as an RTD does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 1, other applications of other types of PUFs, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

With continued reference to FIG. 1, PUF may include, without limitation, PUFs implemented using design of vertical interconnect accesses (VIAs) in multi-layered chips or integrated circuits. A "VIA-PUF" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF. Such a VIA-PUF may be extremely robust over time and across environmental conditions.

Continuing to refer to FIG. 1, PUF may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer. Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of light, which may include, as a non-limiting example, a pulse in the femtosecond to attosecond range, such as, for illustrative purposes only, a 175-femtosecond pulse from a model-locked laser having a 90-MHz repetition rate. Fabrication may include incorporation of the light source. In operation, Optical output waveforms may also be complex and highly sensitive to precise physical cavity structure; at the same time responses may remain highly repeatable. Continuing the example, ultrashort optical pulses (e.g. in the femtosecond to attosecond region) may be used to probe micro-cavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF. Alternative or additional non-linear photonic devices may be used to implement a photonic PUF.

Further viewing FIG. 1, other examples of PUF that may be used may include, without limitation, nano electromechanical (NEM) PUFs. NEM PUFs may include PUFs that leverage stiction of a silicon nanowire to a binary gate structure. NEM PUFs may include those based on interfacial magnetic anisotropy energy, such as use of the random distribution of magnetization orientation originating from the sub-nanometer variation of oxide layer produced by the thinning process. In an embodiment, an NEM PUF system may be highly robust; as a non-limiting example, NEM PUF may work effectively across a wide range of environmental conditions, including without limitation thermal variation, exposure to microwave radiation, and exposure to high dose radiation at various frequencies. Additional methods for PUF implementation may include, without limitation Kirchoff-law-Johnson-noise (KLJN) PUFs, which may use KLJN key exchange to generate, between two hardware components, a new and manufacturer-unknown secret key which may be stored locally in, for instance, secure hash memory.

Still referring to FIG. 1, in an embodiment, one or more bits may be output directly from the PUF and/or TPM; such outputs may be used to generate symmetric or asymmetric keys, private keys, zero-knowledge proofs, or other proofs of authenticity, such as without limitation a first secret, second secret, first key, and/or second key as described in further detail below.

Still referring to FIG. 1, computing device 104 may include a processor 112. Processor 112 may be consistent with any processor as described in the entirety of this disclosure. Processor 112 may be configured to load, as a function of secure root of trust 108, a second bootloader 128. A "second bootloader," for the purpose of this disclosure, is new and/or updated bootloader configured to replace an outdated bootloader such as a first bootloader 116. In a non-limiting embodiment, secure root of trust 108 may, for instance, be configured to perform a secure boot of a computing device 104, wherein the secure boot includes generation of one or more cryptographically hashed and/or digitally signed measurements of programs. For example and without limitation, programs may load, measure, digitally sign, and/or otherwise perform attested computing with regard to one or more subsequently loaded and/or "downstream" processes on computing device 104 and/or a remote device. A "bootloader," for the purpose of this disclosure, is a software module that is loaded and run by secure root of trust 108 executed by computing device 104 upon startup. In a non-limiting embodiment, the bootloader may issue attestation documents to the post-boot environment. These documents are deterministically based on a bootloader-specific device key exposed by the secure root of trust 108. In a non-limiting embodiment, the bootloader may include a first stage bootloader. A "first stage bootloader," for the purpose of this disclosure, is a computer program configured to read software images from flash memory, utilizing redundant copies of the images, and launches the operating system on the computing device. In a non-limiting embodiment, the first stage bootloader may launch a second stage bootloader on the computing device. In another non-limiting embodiment, the bootloader may include a second stage bootloader. A "second stage bootloader," defined for the purposes of this disclosure as a bootloader that is configured to load and/or initiate execution of an operating system on the computing device. A bootloader may operate in a privilege mode of a processor above an operating system and hypervisor, such as an originating processor 128 as described above, such as without limitation machine mode in the non-limiting example of the RISC-V processor ISA and may have exclusive access to a portion of memory for a period of time, such as dynamic random-access memory (DRAM). As a non-limiting example of the latter, a bootloader may execute prior to an operating system, hypervisor, and/or other software in order to establish some invariants/restrictions and/or to measure later-activated software; a notion of "privilege" may be implied through this sequencing of operations instead of being a supported property by originating device 104, system 100, or components thereof. Significant software may be activated before activation and/or involvement of a bootloader, such as without limitation firmware, microcode, BIOS, or the like; in an embodiment, components and/or software elements operating prior to and/or above a bootloader may be part of a trusted computing base for system 100 and may be trusted as part of the hardware. Alternatively or additionally, embodiments of a bootloader, and/or of any other components and/or software elements described herein, may be deployed in or used to attest a software-only setting such as attestation of, e.g., Kubernetes containers. In general, a bootloader may implement measurement and facilitate attestation and/or ensure that a security policy of system 100 maintains isolation of mutually distrusting components. A bootloader 132 includes a software monitor generated at originating device 104. A bootloader may check allocation decisions of software operating on system 100 such as originating device 104 and or a plurality of processors and/or computing devices making up at least a first remote device 140a-n for correctness and commit them into hardware configuration registers. A bootloader may maintain a register of owners of protection domains via unique identifier and the associated domains, in non-limiting example associated memory address spaces. Such software may include without limitation operating system, kernel, hypervisor, and/or guest OS. In this nomenclature, an operating system handles scheduling and demand paging, and a hypervisor may multiplex CPU cores of originating device 104 and/or at least a first remote device 140a-n. A "remote device," as used herein, may include a separate device from originating device 104 and./or other CPU cores on originating device 104, and/or other hardware subsystems on a system on chip. Applications signed by and/or monitored by a bootloader, for instance as described in further detail below, may include virtual machine containers such as without limitation docker or Kubernetes containers, web browsers, and/or applications. In a representative embodiment, a bootloader 132 may intermediate untrusted system software handling of isolated machine resources. A bootloader may include a bootloader key. A bootloader key may be used to check the authenticity of the a bootloader. A bootloader key may be generated by random variation in selection of prime numbers, for instance for the purposes of a cryptographic system such as RSA that relies on prime factorization difficulty. A key need not be and/or include a prime number. A bootloader key may be generated by randomized selection of parameters for a seed in a cryptographic system, such as elliptic curve cryptography, which is generated from a seed. A bootloader key may be used to generate exponents for a cryptographic system such as Diffie-Helman or ElGamal that are based on the discrete logarithm problem. A bootloader key may include a single key such as a public key or may include a key pair such as a private and public key pair. In an embodiment, a private and public key pair may be utilized wherein a public key may be used for encryption of a message and a corresponding private key may be used for decrypting an encrypted message. A bootloader key may include device specific secret. Originating processor 128 may load a bootloader at boot time. Loading of a bootloader may include an evaluation of the integrity of a bootloader and/or cryptographic authentication. Evaluation of integrity may be done in a non-limiting example via comparison of a bootloader's cryptographic measurement to at least a hash function output included in the a bootloader and/or located in other memory communicatively coupled to the boot loader. Cryptographic authentication may utilize a time synchronized one-time password generator, in non-limiting example an RSA SecureID token where a device specific secret acts as the seed for a secret generator whose secret output is updated at regular time intervals. Boot time may include the time period when a computer is started up such as for example when power is switched on.

Still referring to FIG. 1, attested boot processes as described above may be performed to load and/or initialize a trusted system in which a trusted software infrastructure signs and/or initializes a software monitor and/or a software object and/or application; trusted software infrastructure may be generated from a hardware root of trust such as a secure root of trust 108 and/or component thereof as described above, acting as a bootloader. Alternatively or additionally, trusted software infrastructure may perform a role of a secure root of trust 108 as described above; that is, where trusted software infrastructure is trusted according to any protocol, including certification by certificate authorities or the like, trusted software infrastructure may perform any action described above as performed by secure root of trust 108 and/or a bootloader, for instance using digital signatures associated with a source of trust of the trusted software infrastructure, including without limitation any digital certificate and/or authorization token as described in this disclosure. As a non-limiting example, a trusted software infrastructure may host one or more mutually distrusting containers, such as Kubernetes, docker, virtual machines, or the like; Attestation of these containers may follow any process for attested boot and/or attested computing as described in this disclosure. Everything before a "boot time," however implemented, may be trusted, while everything after is "measured", allowing a user of system 100 and/or a device interacting with system 100 to decide whether or not they it should trust the system based on whether this measurement belongs to a set of expected values.

In a non-limiting embodiment, secure root of trust 108 may include a secure first stage bootloader that relies only on well-understood quantum-resistant symmetric cryptography, such as a cryptographic hash function and HMAC, (e.g. via SHA3-512, which is recommended by NIST for 2030 and beyond). In a non-limiting embodiment, the first stage bootloader securely loads and produces a unique key seed for a secure second-stage bootloader with relevant public key cryptography.

With continued reference to FIG. 1, second bootloader 128 may be configured to generate a secret-specific public datum 136. A "secret-specific public datum," as used in this disclosure is a collection of information identifying a bootloader, wherein second bootloader 128 may be configured to sign secret-specific public datum 136 as a function of a digital signature. For example and without limitation, secret-specific public datum 136 may include, but not limited to, a public key, a private key, a pair of public and private keys, digital signature, a verification datum, and the like thereof. In another non-limiting example, secret-specific public datum 136 may be generated as a function of an asymmetric FSA key pair, symmetric encryption, etc. Second bootloader 128 may be configured to load an untrusted software image. As used in this disclosure, an "untrusted software image" is a serialized copy of the entire state of a computer system stored in some non-volatile form such as a file. In a non-limiting embodiment, second bootloader 128 may want to replace first bootloader 116 with its software image which is currently untrusted and needs to be trusted. The untrusted software image may be exposed as a function of a device-specific secret such as second secret 132. In a non-limiting embodiment, second bootloader 128 may generate, as a part of secret-specific public datum 136, a second bootloader identity document, wherein the second bootloader identity document is signed by secret-specific public datum 136 and/or second secret 132. A "second bootloader identity document," for the purpose of this disclosure, is an identifier of the second bootloader's software image signed by the second bootloader. In another non-limiting embodiment, second bootloader 128 may generate a measurement of the untrusted software image in memory such as read-only memory. The measurement of the untrusted software image may include, but not limited to, an enclave, hypervisor, bios, firmware, operating system image, embedded, and the like thereof, in which root of trust 108 wants to verify the identity of.

With continued reference to FIG. 1, in a non-limiting embodiment, secret-specific public datum 136 may include its own secret key. In a non-limiting embodiment, second secret key may be implemented in any manner suitable for implementation of first secret key. Second bootloader 128 may be configured to generate a public key and a private key of second bootloader. In a non-limiting embodiment, the second secret key may include the private key for second bootloader 128. In another non-limiting embodiment, the second secret key may include the public key for second bootloader 128. Alternatively or additionally, the second secret key may include a key and/or pair of keys associated with second bootloader 128. In a non-limiting embodiment, secure root of trust 108 may have access to the device-specific secret of second bootloader 128, wherein the device-specific secret may be known only to second bootloader 128 and secure root of trust 108. In some embodiment, the device-specific secret may include and/or identify second secret key 136. In a non-limiting embodiment, computing device 104 may be instructed to replace first bootloader 116 with second bootloader 128.

Still referring to FIG. 1, secret-specific public datum 136 may include a bootloader measurement. A "bootloader measurement," as used in this disclosure, is a cryptographic hash, or other representation deterministically linked to the bootloader, of a bootloader to be "measured," which may include a hash of inputs to the program, outputs to the program, and/or a representation of the program itself, such as without limitation binary code of the program, source code of the program, bytecode of the program, or the like. In a non-limiting embodiment, the bootloader measurement may be implemented, without limitation, as described in U.S. Nonprovisional application Ser. No. 16/682,317. In a non-limiting embodiment, secret-specific public datum 136 may be generated using and/or according to a cryptographic protocol. A "cryptographic protocol," for the purpose of this disclosure, is a cryptographic protocol for generation, hashing, and/or digital signatures using and/or producing secret-specific public datum 136, which may be implemented without limitation in any manner suitable for such implementation that may occur to persons skilled in the art upon reviewing the entirety of this disclosure. In a non-limiting embodiment, the cryptographic protocol may include secure root of trust 108 configured to derive the bootloader measurement by generating a cryptographic hash of second bootloader 128. In a non-limiting embodiment, the bootloader measurement may include a unique binary, which may be recognized by secure root of trust 108. In a non-limiting embodiment, secret-specific public datum 136 and/or the bootloader measurement may include keys identifying and/or possessed by a bootloader, where "identifying" may indicate use of the key or keys in a digital signature and/or secure proof. In another non-limiting embodiment, secret-specific public datum 136 may include, without limitation, any secret information suitable for use as and/or for generation of any cryptographic key, key seed, or other basis for secure proofs, digital signatures, encryption, and/or decryption that may occur to a person skilled in the art upon reviewing the entirety of this disclosure.

With continued reference to FIG. 1, the bootloader measurement may be generated as a function of a second cryptographic protocol. A "cryptographic protocol," for the purpose of this disclosure, is a protocol that includes generating a cryptographic hash. In a non-limiting embodiment, the cryptographic protocol may include secure root of trust 108 configured to derive the bootloader measurement for second bootloader 128 by generating a second cryptographic hash of second bootloader 128. In another non-limiting embodiment, the second bootloader measurement may be generated in any manner suitable for generation of a bootloader measurement for first bootloader 116. The cryptographic protocol for generating the bootloader measurement of second bootloader 128 may be designed and configured to be distinct from the cryptographic protocol for generating the bootloader measurement of first bootloader 116. This may include having the binaries of the cryptographic hash of the bootloader measurement of first bootloader 116 and second cryptographic hash of the bootloader measurement of second bootloader 128 to be unique. In a non-limiting embodiment, any bootloader measurement may include a unique binary, which may be recognized by secure root of trust 108.

With continued reference to FIG. 1, in a non-limiting embodiment, secret-specific public datum 136 may include a key on computing device 104 in which the key is already trusted by a manufacturer in a secure computing environment. In a non-limiting embodiment, secret-specific public datum 136 may include a priori trust. A "priori trust," as used in this disclosure, is a trust that is already established via some trusted provisioning step at the secure environment by the manufacturer and/or a trusted verifier 144. A "trusted verifier," for the purpose of this disclosure, is a supervising entity that trusts any bootloader and verifies that a replaceable bootloader trusts the replacing bootloader. In a non-limiting embodiment, the priori trust endorses the identification document of second bootloader 128 of secret-specific public datum 136, which exposes the untrusted software image, in which trusted verifier 144 must verify. In a non-limiting embodiment, trusted verifier 144 may include a human operator at a factory of the secure computing environment that has all the information involving the identity and/or integrity of a plurality of bootloaders. In some embodiments, trusted verifier 144 may include the manufacturer. Furthermore, the priority rust of secret-specific public datum 136 may be reestablished in the event an old bootloader is replaced. Because secret-specific public datum 136 has a priori trust, it may endorse secret-specific public datum 136 and its components such as the untrusted software image of second bootloader 128. Persons skilled in the art, upon reviewing the entirety of this disclosure, will be aware of the various embodiments of a trusted verifier and priori trust in the context of verification.

With continued reference to FIG. 1, in a non-limiting embodiment, second bootloader 128 may be configured to generate a second bootloader commitment 152. A "second bootloader commitment," as used in this disclosure, is a commitment of secret-specific public datum 136 of second bootloader 128. For example and without limitation, second bootloader commitment 152 may be an affirmation by second bootloader 128 that it is authorized to replace first bootloader 116 for secure root of trust 108. In a non-limiting embodiment, secure root of trust 108 may be configured to verify the integrity of second bootloader commitment 152 as a function of secret-specific public datum 136.

Still referring to FIG. 1, secure root of trust 108 may be configured to verify secret-specific public datum 136, wherein the secret-specific public datum 136 may represent a request to switch first bootloader 116 to second bootloader 128. In a non-limiting embodiment, once secret-specific public datum 136 is endorsed by the priori trust of trusted verifier 144, second bootloader 128 may send/relay secret-specific public datum 136 and its message authentication code (MAC), wherein the message authentication code is keyed. In a non-limiting embodiment, the MAC serves as authentication and integrity protection for secret-specific public datum 136 and second bootloader 128. Secure root of trust 108 may verify secret-specific public datum 136 using second secret 120. Secure root of trust 108 may relay to first bootloader 116 secret-specific public datum 136. In a non-limiting embodiment, secure root of trust 108 may relay to first bootloader 116 another MAC. Alternatively or additionally, secure root of trust 108 may receive secret-specific public datum 146, wherein secret-specific public datum 136 is encrypted. Secure root of trust may decrypt secret-specific public datum 136 as a function of verifying secret-specific public datum and relay it to first bootloader 116 for further verification. Secure root of trust 108 may use any cryptographic function for decryption/encryption purposes. Persons skilled in the art, upon reviewing the entirety of this disclosure, will be aware of the various embodiments of maintaining authentication integrity for purposes as described herein.

Still referring to FIG. 1, processor 112 may be configured to load a first bootloader 116 onto computing device 104. A "first bootloader," as used in this disclosure is a bootloader configured to be replaced by a new bootloader. In a non-limiting embodiment, first bootloader 116 may include an old and/or outdated bootloader, wherein first bootloader 116 is to be replaced by second bootloader 128. Loading first bootloader may include the same methods and actions for loading second bootloader 128 as described above. In a non-limiting embodiment, first bootloader 116 may be configured to sign secret-specific public datum 136 received from secure root of trust 108 as a function of first secret 120. In another non-limiting embodiment, first bootloader 116 may generate a digital signature as a function of signing secret-specific public datum 116. Alternatively or additionally, first bootloader 116 may include its own secret-specific public datum, wherein the secret-specific public datum of first bootloader 116 may be generated the same way as secret-specific public datum 136 is generated. In some embodiments, the secret-specific public datum of first bootloader 116 may include any components of secret-specific public datum 136 as described above, wherein the components are related to first bootloader 116. Persons skilled in the art, upon reviewing the entirety of this disclosure, will be aware of the various embodiments of the first bootloader for purposes as described herein.

With continued reference to FIG. 1, first bootloader 116 may be configured to generate a second bootloader endorsement 148. A "second bootloader endorsement," as used in this disclosure, is an endorsement by first bootloader 116 verifying secret-specific public datum 136 of second bootloader 128 for computing device 104. In a non-limiting embodiment, second bootloader endorsement 148 may be verified by some trusted verifier such as certificate authority 156 and/or trusted verifier 144. In a non-limiting embodiment, second bootloader endorsement 148 may be used to optimize the verification of second bootloader 128 and its secret-specific public datum 136. A "certificate authority," for the purpose of this disclosure, is an entity that issues digital certifications. A "digital certificate," for the purpose of this disclosure, is a public key certificate used to prove ownership of a public key. In a non-limiting embodiment, certificate authority 156 may generate and transmit digital certificate 160 certifying second bootloader 128. In another non-limiting embodiment, certificate authority 156 may previously have generated a certificate certifying first bootloader 116. In a non-limiting embodiment, secure root of trust 108 may be further configured to replace the first bootloader 116 with second bootloader 128. For instance, and in an exemplary embodiment, system's initial identity may at some point be deemed to rely on deprecated cryptography, for instance as a result in advances in quantum computing and/or other improvements in computing power, computer architecture, and/or cryptanalysis. In a non-limiting embodiment, certificate authority 156 may be configured to receive ticket 140 from secure root of trust 108 and generate digital certificate 160 certifying second bootloader 128.

Still referring to FIG. 1, in another non-limiting embodiment, trusted verifier 144 may be configured to receive the digital signature from first bootloader 116. Trusted verifier 144 may verify secret-specific public datum 136 as a function of secret-specific verification datum. A "secret-specific verification datum," as used in this disclosure, is any verification datum associated with the device-specific secret of the bootloader trusted verifier 144 is attempting to trust/verify. In a non-limiting embodiment, trusted verifier 144 may issue a certificate to secret-specific public datum 136. The certificate may be issued as a function of trusted verifier 144 trusting first bootloader 116 and second bootloader 128, wherein trusting certificate authority 156 may be configured to trust the bootloaders and their measurements. For example and without limitation, first bootloader 116 may transmit a secret-specific public datum of first bootloader containing a unique binary such as the bootloader measurement of first bootloader 116. Certificate authority 156 may trust the bootloader measurement of first bootloader 116 and the bootloader measurement of second bootloader 128. This may further be enhanced by the second bootloader endorsement 148 by first bootloader 116. In another non-limiting, Certificate authority 156 may further trust the priori trust of secret-specific public datum 136. In a non-limiting embodiment, certificate authority 156 may be configured to facilitate, to a remote trusted verifier 144, to trust secret-specific public datum 136, wherein the trust may be represented in the form of second bootloader trust 164. A "second bootloader trust 164," for the purpose of this disclosure, is a priori trust by first bootloader 116. In a non-limiting embodiment, second bootloader trust 164 may be configured to replace the previous priori trust of second battery pack datum 136 and/or second bootloader 128.

Still referring to FIG. 1, alternatively or additionally, the trusting of any bootloader and/or bootloader measurement may be done as a function of a local attestation. "Local attestation," as used in this disclosure, is a process of proving a bootloader and its components and/or image. In a non-limiting embodiment, secure root of trust 108 may be configured to generate a ticket 140 as a function of the signed secret-specific public datum 136 and transmit ticket 140 to trusted verifier 144. A "ticket," as used in this disclosure, is an integrity-checked data structure tagged with the measurement of a second program, which may be referred to herein as a "recipient," and a first program, such as without limitation, first bootloader 116, which may be referred to herein as a "sender." Recipient may be selected and/or designated by sender. For instance, and without limitation, secure root of trust 108 may receive from first bootloader 116, a ticket initiation command referencing a second bootloader 128, which may be operated on same computing device 104 as first bootloader 116, and may include any bootloader sufficient for implementation of first bootloader 116. A "ticket initiation command," for the purpose of this disclosure, is a computer command that references second bootloader 128.

Still referring to FIG. 1, in an exemplary threat model, ticket interface may be tampered with by an adversary modifying a "create ticket" command to initiate generation of ticket. A result of the command, however, may be furnished to trusted second-stage bootloader directly by secure root of trust 108, and may therefore not be mediated by any untrusted software. In a non-limiting embodiment, both bootloaders may sign the vulnerable ticket using any suitable digital signature as described above, allowing the certificate authority 156 to validate, or reject, the entire local attestation protocol.

At this point, a user and/or system may replace a first second-stage bootloader with a modern binary such as one that employs FALCON, or a forthcoming future standard. While upgrade may safely occur in a manufacturer's trusted setting (they can ensure that the new bootloader's public key corresponds to the same, trusted device as the previously certified public key), this is not ideal as it presents an enormous logistical burden. Use of ticket may permit upgrades to be performed wherever computing device 104 is located, using remote communication. In an exemplary embodiment, certificate authority 156 trusts a deprecated bootloader (i.e., first bootloader 116) binary, and a previously issued certificate for the deprecated bootloader's public key. As shown in an exemplary protocol diagram illustrated in FIG. 3, a local attestation (tickets) interface implemented by secure root of trust 108 may allow second bootloader 128, referred to as a new bootloader, to prove to a certificate authority 156 that its public key corresponds to the new bootloader on a previously certified device. In a non-limiting embodiment, the new bootloader may be able to link itself to a previous bootloader (i.e., first bootloader 116 on a trusted device such as computing device 104).

Alternatively or additionally and still referring to FIG. 1, secure root of trust 108 may further be configured to authenticate programs using tickets as described above. For instance, secure root of trust 108 may be configured to receive ticket 140 containing a measurement of a second bootloader 128 and first cryptographic hash, generate a second cryptographic hash of the second bootloader 128, compare the second cryptographic hash to the measurement of the second bootloader 128, and authenticate the second bootloader 128 as a function of the comparison. In other words, when presented with ticket 140 alongside a boot image, secure root of trust 108 may "redeem" ticket 140 if and only if a recipient thereon matches boot image binary's measurement, and ticket 140's integrity is verified. This primitive may allow two second-stage bootloaders to exchange integrity-checked messages that confer their co-location on the same device-ticket may thus be a useful primitive with which it is possible to implement secure bootloading with field upgradeable cryptography.

With continued reference to FIG. 1, secure root of trust 108 may be configured to erase the device-specific secret from active memory after signing first bootloader 116 and/or second bootloader 128. "Active memory," as described herein, is memory accessible to the. This may aid in situations in which an outdated bootloader (e.g. first bootloader 116) and/or its deprecated cryptosystem associated therewith is no longer deemed trustworthy. In a non-limiting embodiment, certificate authority 156 may issue digital certificate 160 and/or any digital certificate with an expiration date of hours and/or weeks instead of years or decades. In another non-limiting embodiment, computing device 104 may be configured to replace first bootloader 116 with second bootloader 128 within a restricted time limit such as an upgrade window. An "upgrade window," for the purpose of this disclosure, is a restriction of time during which an upgrade (e.g. replacing of an outdated bootloader) must be initiated, performed, completed, or the like thereof. This may be so, at least in part, to prevent any interference to recover the deprecated bootloader's secret-specific public datum. In a non-limiting embodiment, certificate authority 148 may verify correct execution of a local attestation protocol. In another non-limiting embodiment, certificate authority 148 may deny certifying obsolete bootloaders after their upgrade window has closed. Secure remote execution platforms may serve as auditable, policy-driven certificate authorities. Upgrade window may be enforced by incorporating a temporal element in a certificate. Temporal element may include any temporal element and/or element suitable for us in a time-limited and/or time-varying token as described in 1039-040USU1, the entirety of which is incorporated herein by reference. For instance, time-varying token may have a time limit after which time-varying token is no longer valid. Time limit may be calculated from an initial time, which may be a datum linked to a particular timestamp or other value representing a fixed moment in time, associated with time-varying token; initial time may be a time of creation, a time of verification, or other significant time relating to validity of time-varying token. Initial time may include, without limitation, a timestamp, which may include a secure timestamp, and/or a datum linked to a secure timestamp, such as a cryptographic hash of the secure timestamp or the like. As used herein, a secure timestamp is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent.

Further referring to FIG. 1, a non-limiting example of an application programming interface (API) which may be used in connection with embodiments of above-described methods and/or systems is as follows:

```
enum boot_command { BOOT_MODE_DEBUGGABLE = 0x0; BOOT_MODE_SECURE =
0x1; BOOT_CMD_PASS_BLOB = 0x2; BOOT_CMD_CREATE_TICKET = 0x4;
BOOT_CMD_REDEEM_TICKET = 0x8;
};
typedef struct {
uint8_t bytes[48];
} measurement_t;
typedef struct {
size_t len;
uint8_t bytes[len]; } boot_command_data_blob_t;
typedef struct {
measurement_t recipient;
size_t message_len;
uint8_t message_bytes[message_len]; boot_command_data_ticket_t out_ticket; // populated at boot
} boot_command_data_create_ticket_t;
typedef struct { measurement_t cmd_hmac;
measurement_t recipient; measurement_t sender;
size_t message_len;
uint8_t message_bytes[message_len];
} boot_command_data_ticket_t;
typedef struct {
union {
Boot_command_data_blob_t blob;
Boot_command_data_create_ticket_t create_ticket; Boot_command_data_ticket_t ticket;
}
} boot_command_data_t;
// simplified syntax meant to convey the data structure; not valid C typedef struct {
uint32_t boot_command;
// Secure application binary size_t boot_image_len;
uint8_t boot_image[boot_image_len];
// Additional data to be interpreted in a command-specific way
boot_command_data_t boot_command_data; } boot_image_t;
```

Still referring to FIG. 1, secure root of trust 108 may start with a 62-byte device secret KD. A function ROT.BLGen (KD, KB) may be used to create a bootloader specific secret that is unique to each computing device. The function is implemented as follows:

```
function ROT.BLGen(byte [64] KD, byte[ ] BL) {
  byte [ ] KB = ROT_KDF(KD, BL)
  return KB
}
```

KD is a device secrete as a binary string. BL is a binary representation of a bootloader code. Secure root of trust 108 may also implement the function ROT.VerifyINITBL(KD, BL, pk, tag) which verifies that a bootloader actually generated the tag for the pk. The function may be implemented as follows:

```
function ROT.VerifyInitBL(byte [64] KD, byte [ ] BL, byte [ ] pk, byte [ ] tag) {
    byte [ ] KB = ROT_KDF(KD, BL)
    byte [ ] realtag = MAC(KB, pk)
    if (realtag == tag) {
        return true
    } else {
        return false
}
```

A bootloader may be implemented using the function BL.InitBL which uses the bootloader secret and the bootloader measurement of its own code to generate (BL, pk, tag). The function is implemented as follows:

```
function BL.InitBL(byte [64] KB, byte [ ] BL) {
    byte [64] KBmac = Bootloader_KDF(KB, isMac=true)
    byte [66] KBsign = Bootloader_KDF(KB, isMac=false)
    byte [ ] (sk, pk) = KeyGen(DBRG(KBsign))
    byte [64] tag = KMAC(KBmac, pk)
    return BL, pk, tag
}
```

The function BL.SignBL may be use the bootloader secret to sign (BL,pk) the measurement of a different bootloader and its public key. The function goes as follows:

```
function BL.SignBL(byte [64] KB, byte [ ] BL2, byte [ ] pk2) {
    byte [64] KBmac = Bootloader_KDF(KB, isMac=true)
    byte [64] KBsign = Bootloader_KDF(KB, isMac=false)
    byte [ ] (sk, pk) = KeyGen(DBRG(KBsign))
    (BL2, pk) = SHA3(BL2) || SHA3(pk)
    byte [ ] sig = Sign(sk, SHA3(BL2) || SHA3(pk))
    return sig
}
```

A function OEM.Verify(pk1, BL2, pk, sig) may be used to verify the claim that the owner of pk1 associated BL2 with pk. It is important to note that the OEM must verify out of band that pk1 is associated with an approved bootloader on an approved device, and that BL2 is an approved binary. An honest pk1 will sign any bootloader and pk combination that is loaded on its ROT. pk1 is a public key of a trusted bootloader. BL2 is an authorized bootloader binary file. A sig is a signature from owner of pk1.
The function goes as follows:

```
function OEM. Verify(byte [ ] pk1, byte [ ] BL2, byte [ ] pk, byte [ ] sig) {
    // call signature verification function
    // use the unambiguous concatenation function
    //(BL2, pk) = SHA3(BL2) || SHA3(pk)
    return Verify(pk1, SHA3(BL) || SHA3(pk), sig)
}
```

A key derivation function (KDF) may be used, wherein the KDF takes as input a secret and an auxiliary input to derivate a new key. The KDF may be implement using the bootloader KDF using a PRF in counter mode as described in NIST SP 800-185 section 5.1, with KMAC256 as the basis of our PRF. KMAC256 is used rather than KMACXOF256. The code goes as follows

```
function ROT_KDF(byte [64] KD, byte[ ] BL) {
    // counter defined by NIST SP 800-108, section 5.1
    byte i = 0x01
        // Label (purpose for KDF) defined by NIST SP 800-108
```

-continued

```
    byte [ ] Label = encodeAsBytes('Gradient MAC KDF v 1.0')
    // Context (unique input to KDF) defined by NIST SP 800-108,
    byte [ ] Context = ""
    // Output length L defined by NIST SP 8000-108, section 5.1
    byte [2] L = 0x01 || 0x00 // 512 expressed in 2 bytes
    // Input label is defined by NIST SP 8000-108, section 5.1
    byte [ ] input = i || Label || 0x00 || Context || L
    // Main input string defined by NIST SP 800-185
    byte[ ] X = input
    //Number of bits of output, defined by NIST SP 800-185
    // L' must equal L
    Int L' = 512
    // Customization string, defined by NIST SP 800-185
    // Left as empty string because all necessary context is
    byte [ ] S = ''
    / Compute output as single iteration of counter mode
    // defined by NIST SP 800-108, section 5.1
    byte [64] Kout = KMAC256(KD, X, L', S)
    return Kout
}
```

A method for generating MAC and signature specific keys may be required:

```
function Bootloader_KDF(byte [64] KB, bool isMac) {
    if (isMac) {
        // counter defined by NIST SP 800-108, section 5.1
        byte i = 0x01
        // Label (purpose for KDF) defined by NIST SP 800-108
        byte [ ] Label = encodeAsBytes('Gradient MAC KDF v 1.0')
    } else {
        // counter defined by NIST SP 800-108, section 5.1
        byte i = 0x02
        // Label (purpose for KDF) defined by NIST SP 800-108
        byte [ ] Label = encodeAsBytes('Gradient MAC KDF v 1.0')
        // Label (purpose for KDF) defined by NIST SP 800-108
        byte [ ] Label = encodeAsBytes('Gradient MAC KDF v 1.0')
}
```

-continued

```
    // Context (unique input to KDF) defined by NIST SP 800-108,
    byte [ ] Context = ""
    // Output length L defined by NIST SP 8000-108, section 5.1
    byte [2] L = 0x01 || 0x00 // 512 expressed in 2 bytes
    // Input label is defined by NIST SP 8000-108, section 5.1
    byte [ ] input = i || Label || 0x00 || Context || L
    // Main input string defined by NIST SP 800-185
    byte[ ] X = input
    //Number of bits of output, defined by NIST SP 800-185
    // L' must equal L
    Int L' - 512
```

```
        // Customization string, defined by NIST SP 800-185
        // Left as empty string because all necessary context is
        byte [ ] S = ''
        / Compute output as single iteration of counter mode
        // defined by NIST SP 800-108, section 5.1
        byte [64] Kout = KMAC256(KD, X, L', S)
        return Kout
    }
```

HMAC with SHA-256 or SHA3-256 for the KDF may be used. The code may follow:

```
function Bootloader_KDF_HMAC(byte [64] KB, bool isMac) {
  if (isMac) {
    // counter defined by NIST SP 800-108, section 5.1
    byte i = 0x01
    // Label (purpose for KDF) defined by NIST SP 800-108
    byte [ ] Label = encodeAsBytes('Gradient MAC KDF v 1.0')
  } else {
    // counter defined by NIST SP 800-108, section 5.1
    byte i = 0x02
    // Label (purpose for KDF) defined by NIST SP 800-108
    byte [ ] Label = encodeAsBytes('Gradient MAC KDF v 1.0')
    // Label (purpose for KDF) defined by NIST SP 800-108
    byte [ ] Label = encodeAsBytes('Gradient MAC KDF v 1.0')
  }
  // Context (unique input to KDF) defined by NIST SP 800-108,
  byte [ ] Context = ""
  // Output length L defined by NIST SP 8000-108, section 5.1
  byte [2] L = 0x01 || 0x00 // 512 expressed in 2 bytes
  // Input label is defined by NIST SP 8000-108, section 5.1
  byte [ ] input = i || Label || 0x00 || Context || L
  // Compute HMAC, defined by NIST SP 198-1, section 4
  // Use any approved hash function. SHA-256 is best, but SHA3 is also allowed.
  byte [64] Kout = HMAC(KD, input)
  return Kout
}
```

A message authentication code (MAC) may be implemented which is a symmetric signature that protects the integrity of a message. Since the ROT needs to implement the MAC, Gradient needs to pick a single resilient MAC implementation that will stay fixed even if the rest of the crypto suite needs to be changed. For efficiency, KMAC256 may be used. In a non-limiting embodiment, the MAC may represent BL as a DER encoded Octet string and then append pk. In another non-limiting embodiment, MAC may use ash BL and pk independently and then concatenate the results. This is slower, increases the size of the ROT codebase, and adds another cryptographic primitive. An MAC code may follow:

```
// K: secret associated with specific bootloader as a binary
// BL: fixed size hash of a bootloader image
// pk: fixed size hash of a public key
function Bootloader_MAC(byte [64] K, byte[ ] BL, byte[ ] pk) {
    // Main input string defined by NIST SP 800-185
    // Hashing each input individually with SHA3
    byte [ ] X = BL ||pk
    // Number of bits of output, defined by NIST SP 800-185
    byte [ ] S = encodeAsBytes('Gradient Booloader MAC v 1.0')
    // Compute MAC, defined by NIST SP 800-185, section 4.2
    byte [64] tag = KMAC256(KD, X, L, S)
    return tag
}
```

An alternative construction of HMAC may include:

```
// K: secret associated with specific bootloader as a binary
// BL: fixed size hash of a bootloader image
// pk: fixed size hash of a public key
function Bootloader_HMAC(byte [64] K, byte[ ] BL, byte[ ] pk) {
    // Main input string defined by NIST SP 198-1
    // Since BL and pk are of fixed length, we can just concatenate them together
    byte [ ] text = BL ||pk
    // Compute MAC, defined by NIST SP 198-1, section 4
    // Use any approved hash function. SHA-256 is best, but SHA3 is also allowed.
    byte [64] Kout = HMAC(K, text)
    return tag
}
```

The bootloader may be configured to compute a keypair for a public key signature scheme using the bootloader specific secret k=Bootloader KDF(KD, BL) derived from the device secret KD. The process for that may be: sk, pk=KeyGen (PRNG(k)). All public key generation algorithms require a source of randomness. For the bootloader randomness must be provided by a pseudorandom number generator seeded with the bootloader specific secret.

Figure 2:
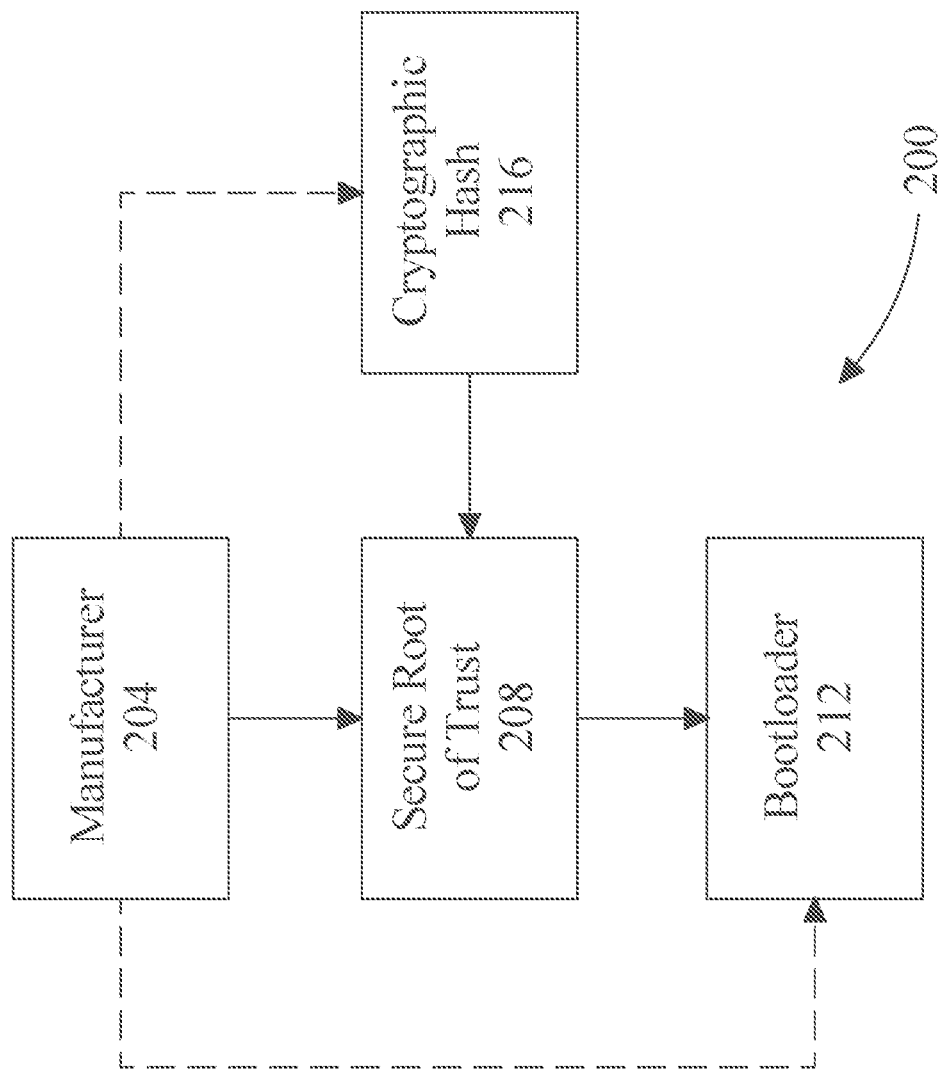
FIG. 2 is a schematic diagram illustrating an exemplary protocol for a cryptographic agile bootloader for upgradable secure computing environment.

Referring now to FIG. 2, a schematic diagram illustrating an exemplary protocol 200 for a cryptographic agile bootloader for upgradable secure computing environment is illustrated. System 200 may include a manufacturer 204. A "manufacturer," for the purpose of this disclosure, is an entity that oversees the protocols and systems as described in this disclosure. Manufacturer 204 may certify an "initial" identity such as a public key deterministically derived by a factory-provided "reference" second-stage bootloader. In a non-limiting embodiment, manufacturer 204 may supply to secure root of trust 208 a cryptographic hash 216. The key derivation need only happen once, as the device can store an encrypted key pair (via AES-256) in untrusted storage, and derive a symmetric key from its unique key seed provided by the root of trust. Secure root of trust 208 may be consistent with any secure root of trust as described in the entirety of this disclosure. In a non-limiting embodiment, secure root of trust 208 may compute a cryptographic hash 216 (e.g. SHA3-512) of the supplied second-stage bootloader binary as described above. The resulting hash is the bootloader's measurement such as the second cryptographic hash as described above. The second cryptographic hash may be keyed with a secret key (e.g. private key) of computing device 104. The secret key may include the device-specific secret. The device-specific secret may be exclusively used for the above-mentioned purposes as described herein.

With continued reference to FIG. 2, secure root of trust 208 and/or the device secret key may derive unique key seed such as the key seed for bootloader 212. Bootloader 212 may be consistent with any bootloader as described herein. In a non-limiting embodiment, bootloader 212 may include first bootloader 116 configured to be replaced by second bootloader 128. In another non-limiting embodiment, a first stage bootloader may securely load and produce the key seed for a secure second-stage bootloader with relevant public key cryptography. The key seed may include an HMAC of the measurement via SHA3-512 keyed with the device secret key such as the device-specific secret.

Figure 3:
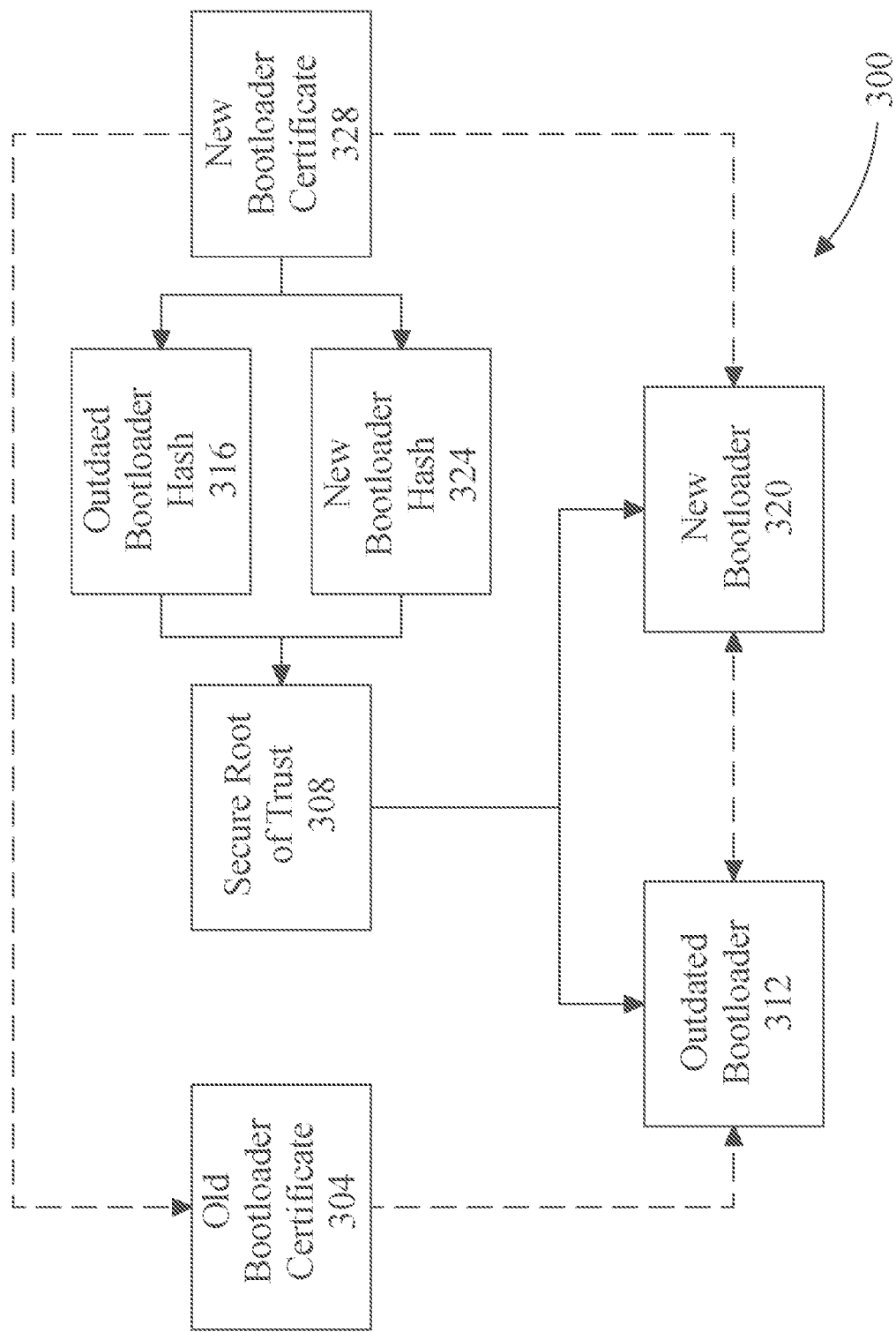
FIG. 3 is a schematic diagram illustrating another exemplary protocol for a cryptographic agile bootloader for upgradable secure computing environment.

Referring now to FIG. 3, a schematic diagram illustrating another exemplary protocol 300 for a cryptographic agile bootloader for upgradable secure computing environment is illustrated. In a non-limiting embodiment, system 300 may include a protocol for a local attestation interface implemented by the secure root of trust, wherein the secure root of trust may be consistent with any secure root of trust as described herein. In a non-limiting embodiment, the local attestation interface may be consistent with any protocol involving the generating of tickets as described herein. For instance, and in an exemplary embodiment, system's initial identity may at some point be deemed to rely on deprecated cryptography, for instance as a result in advances in quantum computing and/or other improvements in computing power, computer architecture, and/or cryptanalysis. At this point, a user and/or system may replace a first second-stage bootloader with a modern binary such as one that employs FALCON, or a forthcoming future standard. While upgrade may safely occur in a manufacturer's trusted setting (they can ensure that the new bootloader's public key corresponds to the same, trusted device as the previously certified public key), this is not ideal as it presents an enormous logistical burden. Use of ticket may permit upgrades to be performed wherever computing device 104 is located, using remote communication. In an exemplary embodiment, certificate authority 156 trusts a deprecated bootloader (i.e., first bootloader 116) binary, and a previously issued certificate for the deprecated bootloader's public key. As shown in an exemplary protocol diagram illustrated in FIG. 3, a local attestation (tickets) interface implemented by secure root of trust 108 may allow second bootloader 128, referred to as a new bootloader, to prove to a certificate authority 156 that its public key corresponds to the new bootloader on a previously certified device. For instance and without limitation, the new bootloader may be able to link itself to a previous bootloader (i.e., first bootloader 116 on a trusted device such as computing device 104).

Still referring to FIG. 3, a bootloader intended to be replaced, such as outdated bootloader 312, may at some point be deemed to rely on deprecated cryptography. An "outdated bootloader," for the purpose of this disclosure, is a bootloader that relies on weaker cryptographic algorithms. At this point, protocol 300 may replace the second-stage bootloader of outdated bootloader 312 with a modern binary (e.g. one that employs FALCON, or a forthcoming future standard) as a part of new bootloader 320. A "new bootloader," for the purpose of this disclosure, is a bootloader relying on strong cryptographic algorithms. Protocol 300 may include a certificate authority that trusts the deprecated bootloader binary, such as outdated bootloader hash 316, and the previously issued certificate for the deprecated bootloader's public key, such as old bootloader certificate 304. An "old bootloader certificate," for the purpose of this disclosure, is a digital certificate certifying outdated bootloader 312 operating on computing device 104. As shown in the protocol diagram, the local attestation (tickets) interface implemented by secure root of trust 308 allows new bootloader 320 to prove to a certificate authority that its public key corresponds to the new bootloader on a previously certified device. Once proved successfully, new bootloader 320 is used a new digital certificate such as new bootloader certificate 328. A "new bootloader certificate," for the purpose of this disclosure, is a digital certificate issued by the certificate authority. For example and without limitation, new bootloader 320 may prove to the certificate authority that it exists on the same machine (computing device 104) as outdated bootloader 312 to execute the replacing of outdated bootloader 312 with new bootloader 320. Persons skilled in the art, upon reviewing the entirety of this disclosure, will be aware of the multiple security measures taken for purposes as described herein.

Still referring to FIG. 3, a digital signature may be used to delegate a credential to a process or device. For instance, and without limitation, a credential may be delegated from a first device having a first private key to a second device having a second private key by the first device signing a message containing a public key associated with the second private key, enabling the second device to demonstrate that it is the recipient of the credential by signing with the second private key. A digital signature may have a property of unlinkability; that is, digital signature may be delegated from one device to another in a way that makes digital signature impossible or practically infeasible to use for deduction of a granting device or of a digital signature that was previously used to derive and/or generate digital signature. In an embodiment, and without limitation, this may be accomplished as follows: a receiving device, which may be a computing device as described herein, may receive an originating signature, originating verification datum, which may include any verification datum, as described above, suitable for verification of the originating signature, from a first device. Receiving computing device may be configured to generate a first anonymized signature set. First anonymized signature set may be generated by a digital signature scheme which may use first device secret linked to first verification datum and originating signature linked to originating verification datum to link a particular secret to a particular device by an anonymous signature. Receiving device may generate a first anonymized signature set which may include a modified first verification datum linked to the first device secret, a modified originating signature, and a modified originating verification datum based on the originating verification datum, whereby the modified originating verification datum verifies the modified originating signature, which may be performed according to any method or method steps as described below, in any combination or with any degree of repetition.

Originating signature may signs a message referencing first verification datum; as used herein, a message referencing first verification datum may include a message containing first verification datum, a message containing a datum having a mathematical relationship to first verification datum, such as without limitation a cryptographic hash generated from first verification datum, and/or a message containing a datum linked to first verification datum in a data structure or other element, such that a device evaluating message may be able to associate message with first verification datum. Such signatures may include and/or utilize Camenisch-Lysyanskaya anonymous signatures, mercurial signatures or other delegable signature schemes. Further examples of unlinkable and/or anonymizable signatures may include, without limitation, examples as described in Nonprovisional application Ser. No. 16/682,809, filed on Nov. 13, 2019, and entitled "METHODS AND SYSTEMS FOR IMPLEMENTING AN ANONYMIZED ATTESTATION CHAIN," the entirety of which is incorporated herein by reference. For example and without limitation, a digital signature may be delegated from one device to another in a way that makes digital signature impossible or practically infeasible to use for deduction of a granting device or of a digital signature that was previously used to derive and/or generate digital signature.

A digital signature may have a property of delegability, as defined and/or described in Provisional Application No. 62/815,493. In a non-limiting embodiment, outdated bootloader 312 and new bootloader 320 may send each other locally attested messages (tickets), which may be implemented by secure root of trust 308 using PUF as described in the entirety of this disclosure.

Figure 4:
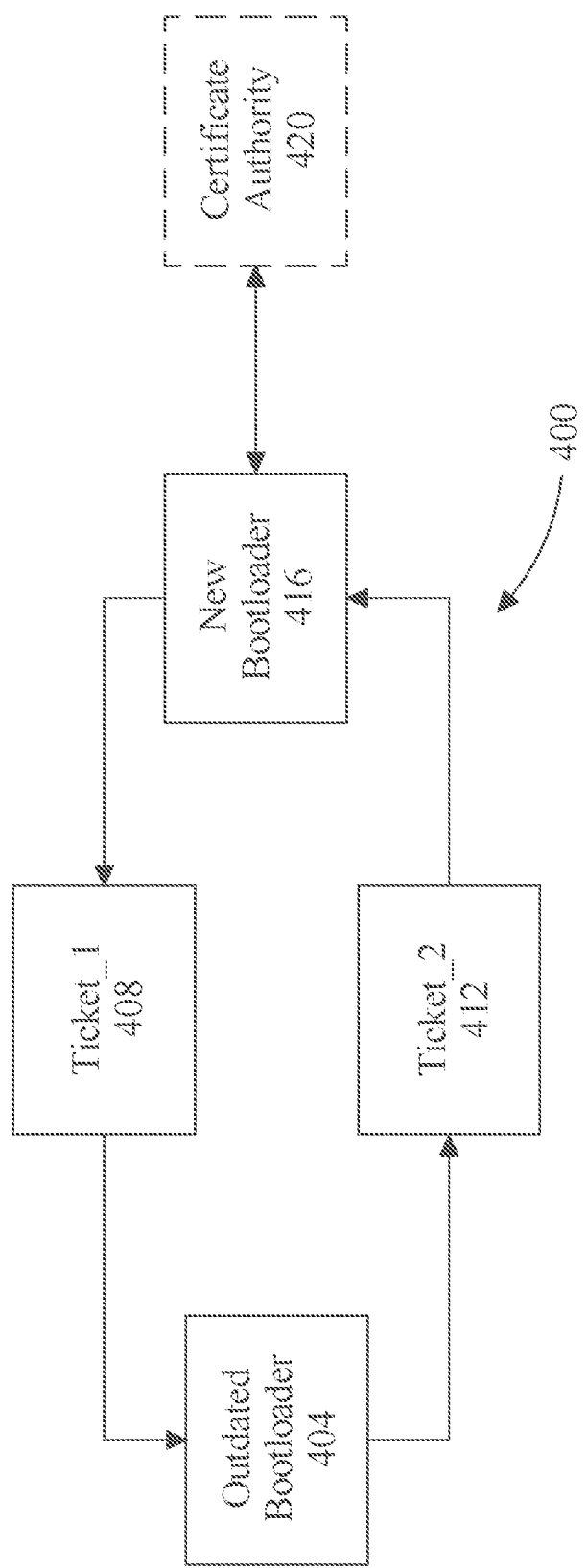
FIG. 4 is a schematic diagram illustrating another exemplary protocol a cryptographic agile bootloader for upgradable secure computing environment.

Now referring to FIG. 4, a schematic diagram illustrating another exemplary protocol 400 for a cryptographic agile bootloader for upgradable secure computing environment is illustrated. Protocol 400 may include new bootloader 416 to create ticket 140, wherein ticket 140 may be consistent with any ticket as described in the entirety of this disclosure. New bootloader 416 may be consistent with any new bootloader as described herein, such as, but not limited to, second bootloader 128. In a non-limiting embodiment, new bootloader 416 may create ticket 140 and transmit ticket 140 to outdated bootloader 404. Outdated bootloader 404 may be consistent with any outdated bootloader as described herein, such as, but not limited to, first bootloader 116. Ticket 140 sent by new bootloader 416 may include ticket 140_1 408. A "ticket_1," for the purpose of this disclosure, is ticket 140 that must be verified by a secure root of trust. Ticket_1 may be generated using the create ticket function. Outdated bootloader 404 may receive ticket 140_1, wherein the secure root of trust verified ticket 140_1 and outdated bootloader 404. Outdated bootloader 404 may generate ticket_2 412 to be sent to new bootloader 416. A "ticket_2," for the purpose of this disclosure, is ticket 140 to be certified by certificate authority 420. In a non-limiting embodiment, ticket_2 may include a request and/or confirmation of an upgrade to new bootloader 416. Once ticket_2 is received by new bootloader 416, certificate authority 420 may verify if the upgrade to new bootloader 416 is valid. In a non-limiting embodiment, certificate authority 420 may be configured to verify if ticket_1 and/or ticket_2 have not been tampered with during any process of the locally attested messaging. In another non-limiting embodiment certificate authority 420 may be configured to transmit verification of ticket 140s despite the tampering. This may be so, at least in part, to continue on with the protocol while maintaining security from external attacks. Certificate authority 420 may confirm and certify new bootloader 416 for the upgrade.

Still referring to FIG. 4, ticket 140 interface may be tampered with by an adversary modifying the create_ticket command. The result of the command, however, may be furnished to the trusted second-stage bootloader directly by the root of trust, and is therefore not mediated by any untrusted software. As shown in the protocol diagram 400, both bootloaders sign the vulnerable ticket, allowing the certificate authority to validate the entire local attestation protocol. Because the certificate authority trusts the bootloader, wherein trusting may be compromised, this trust in the deprecated bootloader must expire when the deprecated cryptosystem is no longer deemed trustworthy. In a non-limiting embodiment, the protocol may incorporate an upgrade window wherein the upgrade window must close before an adversary may be expected to recover the deprecated bootloader's secret key. In a non-limiting embodiment, the certificate authority may be configured to issue relatively short-lived certificates (e.g. hours or weeks instead of years or decades). An "upgrade window," for the purpose of this disclosure, is a time or duration in which an upgrade to a new bootloader must be confirmed or completed within. This may be so, at least in part, to prevent an adversary from tampering for which a person of ordinary skill in the art would appreciate the security measures implemented for purposes as described herein. The certificate authority is expected to verify correct execution of the local attestation protocol, and to deny certifying obsolete bootloaders after their upgrade window has closed.

With continued reference to FIG. 4, a third party such as the certificate authority (CA) is available to verify that the possessor of the private key is a particular entity. For example and without limitation, if the certificate authority may be trusted, and the private key has not been stolen, the ability of an entity to produce a digital signature confirms the identity of the entity and links the file to the entity in a verifiable way. In a non-limiting embodiment, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature. For instance and without limitation, if the public key that decrypts the known signature also decrypts the digital signature, the digital signature may be considered verified. The digital signature may also be used to verify that the file has not been altered since the formation of the digital signature.

Figure 5:
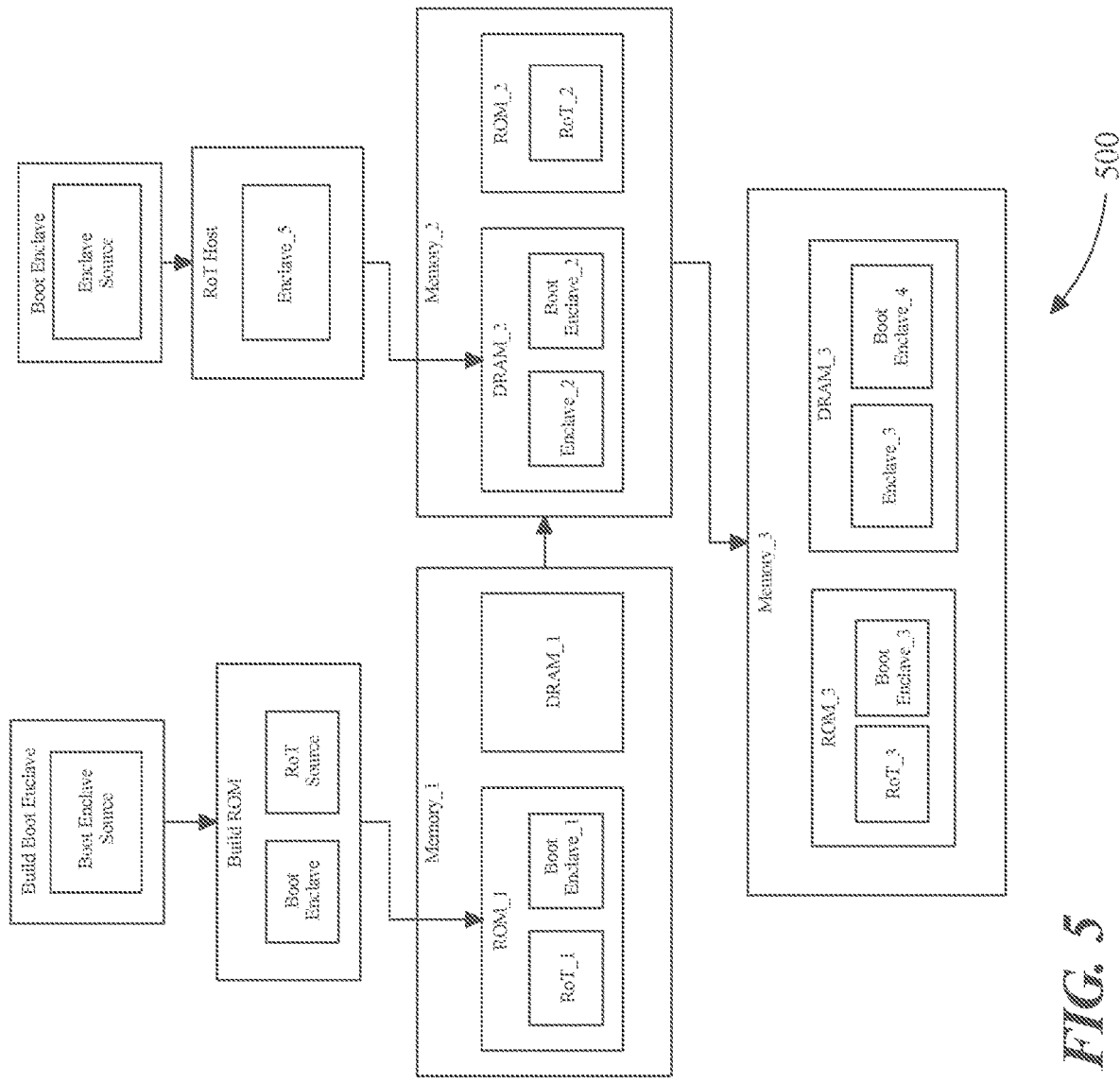
FIG. 5 is a block diagram illustrating an exemplary embodiment of a current structure of memory.

Now referring to FIG. 5, a block diagram illustrating a current structure 500 of memory is illustrated. In a non-limiting embodiment, structure 500 may include a build process for the current structure of memory. In a non-limiting embodiment, structure 500 may include building a boot_enclave. A "boot enclave," for the purpose of this disclosure, is a witness which is similar to a bootloader as described in the entirety of this disclosure. The boot enclave is built expecting to be loaded somewhere in DRAM after the main enclave. In a non-limiting embodiment, a linker script, boot_enclave.lds.in, defines the memory layout for the boot enclave.

Still referring to FIG. 5, structure 500 may be configured to build a main enclave (e.g. boot enclave). This expects to be loaded right at the start of DRAM. The corresponding linker script for this build is called relay.lds.in. The build process may then build the ROM. The ROM linker script is called relay_rom.lds.in . Currently, the ROM includes both the ROT and the boot enclave binary. In a non-limiting embodiment, the boot enclave is built with all the memory addresses/jumps with the assumption that it is being run in the DRAM memory section. However, the boot enclave binary is stored in the ROM section along with the ROT. As part of its execution, the ROT copies the boot enclave into its desired section of DRAM before executing it.

Still referring to FIG. 5, the build process continues with the execution from the ROT inside the ROM. Then, the ROT queries the ROT host for the main enclave. It copies the enclave from I/O memory space to DRAM_1. The build process then include the ROT1 to copies the boot enclave from ROM1 to DRAM1. This is followed by the ROT executing the boot enclave, which performs some crypto and returns back to the ROT. Then, the ROT zero's out the boot enclave from DRAM, wherein the DRAM contains some intermediate secrets hidden from the enclave. Finally, the ROT runs the main enclave. The build process may be configured to include the copying from a memory to another memory and so on. As shown in FIG. 5, the anteceding numerical values for the components of structure 500 are for demonstration purposes and hold no meaning. Persons skilled in the art, upon reviewing the entirety of this disclosure, will be aware of the relationship of the memory between ROT, witness, and enclave for the build process as described herein.

Figure 6:
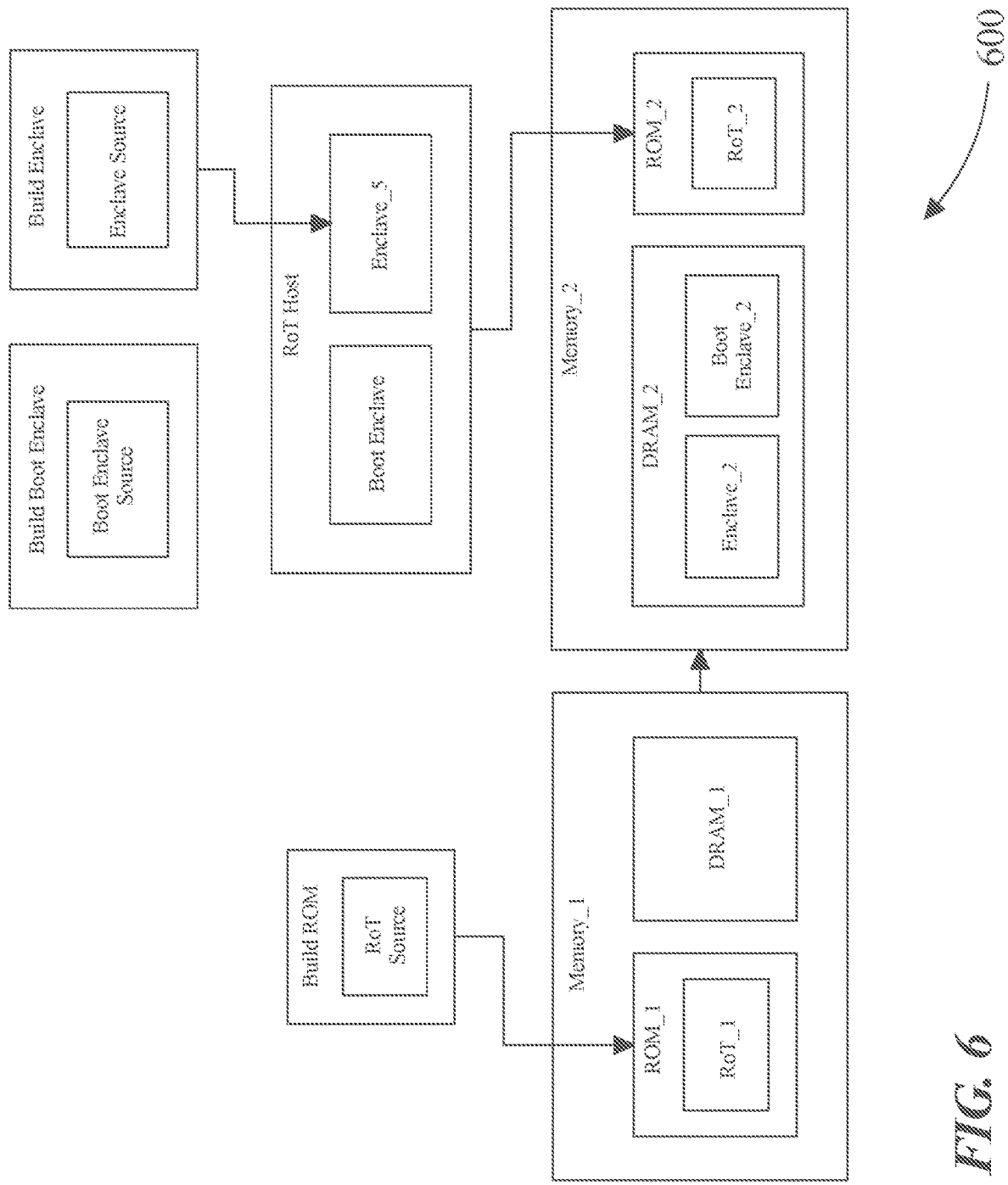
FIG. 6 is a block diagram illustrating an exemplary embodiment of an updated structure of memory.

Referring now to FIG. 6, a block diagram illustrating an exemplary embodiment of an updated structure 600 of memory is illustrated. In a non-limiting embodiment, structure 600 may include an updated build process. For example and without limitation, the updated build process will no longer package the ROT and the boot enclave (e.g. bootloader). This may be so, at least in part, for the ability to switch out of the boot enclave at a later time. In another non-limiting example, the previous bootloader (e.g. the outdated bootloader, the first bootloader, etc.) may include context switches from the ROT to the boot enclave, back to the ROT, and finally to the main enclave. The control flow requirement may not require a structural change. In a non-limiting embodiment, the updated structure 600 may include decoupling of the ROT and the boot enclave.

Still referring to FIG. 6, the build process may be configured so that the ROM build is no longer requires to package the boot enclave binary along with the ROT. This may be so, at least in part, for the isolation of the ROT. As shown in FIG. 6, the build process may include a process of providing the ROT the boot enclave binary. In a non-limiting embodiment, this process may be implemented through the pre-existing ROT host. As shown in FIG. 5, in the current implementation, the main enclave binary is passed to the ROT host at runtime. The ROT issues a LoadRPC call to the ROT host to get the main enclave. It then copies this memory into the beginning of DRAM. As shown in FIG. 6, the updated build process includes the ROT host is fed two binaries at runtime, the main enclave, and the boot enclave. This may be so, at least in part, for the ROT to pass an argument to the LoadRPC which is configured to tell the host what to load. The updated build process then includes getting a binary, wherein the ROT is configured to copy instructions to be able to load the boot enclave into its correct place in DRAM. As shown in FIG. 6, the anteceding numerical values for the components of structure 600 are for demonstration purposes and hold no meaning. Persons skilled in the art, upon reviewing the entirety of this disclosure, will be aware of the various updates for the build process compared to FIG. 5 for purposes as described herein.

Figure 7:
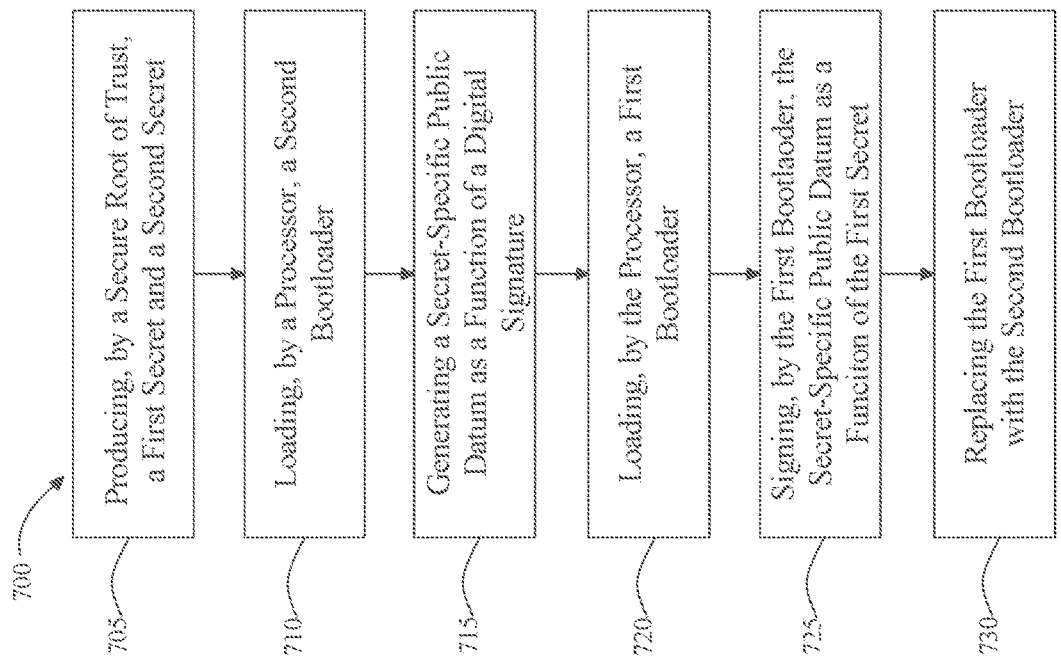
FIG. 7 is a flow chart of an exemplary embodiment of a method for a cryptographic agile bootloader for upgradable secure computing environment.

Referring now to FIG. 7, a flow chart of an exemplary embodiment of a method 700 for a cryptographic agile bootloader for upgradable secure computing environment is provided. Method 700 at step 705, producing, by a secure root of trust, a first secret and a second secret. The secure root of trust may be consistent with any secure root of trust as described herein. The computing device may be consistent with any computing device as described herein. The first secret may be consistent with any first secret as described herein. In a non-limiting embodiment, the secure root of trust may be configured to generate a plurality of device-specific secrets. First secret and second secret may each include the device-specific secret. Persons skilled in the art, upon reviewing the entirety of this disclosure, will be aware of the generating the device-specific secrets in the context of authentication verification.

Still referring to FIG. 7, method 700, at step 710, may include loading, by a processor, a second bootloader. Loading may include any loading means as described in the entirety of this disclosure. The processor may be consistent with any processor as described herein. The second bootloader may be consistent with any second bootloader as described in the entirety of this disclosure.

Still referring to FIG. 7, method 700, at step 715, may include generating, by the second bootloader, a secret-specific public datum as a function of the second secret, wherein the secret-specific public datum further comprises a bootloader measurement. The secret-specific public datum may be consistent with any secret-specific public datum as described herein. The bootloader measurement may be consistent with any bootloader measurement as described herein. In a non-limiting embodiment, method 700, at step 715 may include loading an untrusted software image of the second bootloader, as a function of the second key. The untrusted software image may include any untrusted software image as described herein. For example and without limitation, the untrusted software image may include a state or file of the operating system that the second bootloader is trying to verify. In another non-limiting embodiment, method 700 may include generating a second bootloader identification document as a function of the secret-specific public datum. The second bootloader identification document may include any bootloader identification document as described herein. In a non-limiting embodiment, the second bootloader identification may be generated as a function of the second key. The second bootloader identification document may describe the untrusted software image to a trusted verifier to trust the software image.

With continued reference to FIG. 7, method 700 may include generating a second cryptographic hash of the second bootloader of the computing device. The first cryptographic hash may include a cryptographic hash of the second bootloader. In a non-limiting embodiment, generating the second bootloader measurement may include generating a second cryptographic protocol configured to generate the second cryptographic hash. The second cryptographic protocol may be consistent with any cryptographic protocol of the second bootloader as described herein. The second cryptographic hash my include any cryptographic hash of the bootloader measurement of the second bootloader as described herein.

Still referring to FIG. 7, method 700 may include generating priori trust of the second bootloader. The priori trust may include any priori trust as described herein. In a non-limiting embodiment, method 700 may include generating a second bootloader commitment. The second bootloader commitment may include any second bootloader commitment as described herein.

Still referring to FIG. 7, method 700, at step 720, may include loading, by the processor, a first bootloader. The first bootloader may be consistent with any first bootloader as described in the entirety of this disclosure. In a non-limiting embodiment, method 700 may include generating a secret-specific public datum of the first bootloader. In a non-limiting embodiment, the secret-specific public datum of the first bootloader may include a first bootloader measurement, wherein the first bootloader measurement may be consistent with the bootloader measurement of the first bootloader as described herein. In another non-limiting embodiment, method 700 may include generating a first cryptographic hash of the first bootloader of the computing device. The first cryptographic hash may include a cryptographic hash of the first bootloader. In a non-limiting embodiment, generating the first bootloader measurement may include generating a first cryptographic protocol configured to generate the first cryptographic hash. The first cryptographic protocol may be consistent with any cryptographic protocol of the first bootloader as described herein. The first cryptographic hash my include any cryptographic hash of the bootloader measurement of the first bootloader as described herein.

With continued reference to FIG. 7, method 700 may include relaying to the secure root of trust the secret-specific public datum its message authentication code. The message authentication code may include any message authentication code as described herein.

Still referring to FIG. 7, method 700, at step 725, may include signing, by the first bootloader, the secret-specific public datum as a function of the first secret. In a non-limiting embodiment, signing may include generating a digital signature. In a non-limiting embodiment, the secure root of trust may relay secret-specific public datum to the first bootloader as a function of the message authentication code.

Still referring to FIG. 7, method 700, at step 730, may include replacing the first bootloader with the second bootloader. In a non-limiting embodiment, method 700 may include trusting, by a certificate authority, the secret-specific public datum of the first bootloader, the secret-specific public datum of the second bootloader, and the priori trust of the secret-specific public datum. The certificate authority may include any certificate authority as described herein. In a non-limiting embodiment, method 700 may include trusting a second bootloader endorsement from the first bootloader. The second bootloader endorsement may include any second bootloader endorsement as described herein. In a non-limiting embodiment, method 700 may include generating digital certificate certifying the second bootloader and its secret-specific public datum. The digital certificate may include any digital certificate as described herein.

With continued reference to FIG. 7, method 700 may include facilitating trust by the trusted verifier with the certificate authority of the secret-specific public datum of the second bootloader. In a non-limiting embodiment, facilitating trust may result in generating a second bootloader trust. The second bootloader trust may include any second bootloader trust as described herein. In a non-limiting embodiment, method 700 may include generating a new priori trust by the first bootloader and replacing the previous priori trust of the secret-specific public datum and/or the second bootloader. In another non-limiting embodiment, method 700 may include replacing the first bootloader with the second bootloader as a function of an upgrade window. The upgrade window may be consistent with any upgrade window as described herein. In a non-limiting embodiment, method 700 may include discarding the first bootloader into read-only memory after the second bootloader is finished replacing the first bootloader.

Still referring to FIG. 7, additionally or alternatively, method 700 may include a plurality of phases. In a non-limiting embodiment, phase 1 may include a primordial stage, wherein the primordial stage includes a manufacturer and a trusted environment. Phase 2 may include the manufacturer issuing a request to SW to switch to the second bootloader (BL_2). Phase 3 may include the second bootloader generating a public and secret key to be sent to the secure root of trust (ROT). Phase 3 may further include sending their MAC using a k_2. MAC may be consistent with any MAC as described herein. The k_2 may be consistent with any k_2 as described herein. In a non-limiting embodiment, the k_2 may be known only to the ROT and the BL_2, wherein the MAC is configured to serve as an authentication and integrity protection for the pk_2 and H(BL_2). Phase 4 may include the ROT verifying the authenticity and integrity of pk_2 and H(B_2) using the MAC and computed k_2. Phase 4 may further include sending the verification to BL_1. Phase 5 may include BL_1 signing pk_2 and H(BL_2) using its secret key. Phase 5 may further include sending pk_2, H(BL_2), and its associated digital signature to the manufacturer. Phase 6 may include the manufacture checking the signature of BL_1 using the known pk_1. Phase 6 may further include the manufacturer verifying H(BL_2). In a non-limiting embodiment, if the checking results in a successful verification, a certificate authority issues a certificate to pk_2. Phase 6 may further include replacing BL_1 with BL_2 on the computing device.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
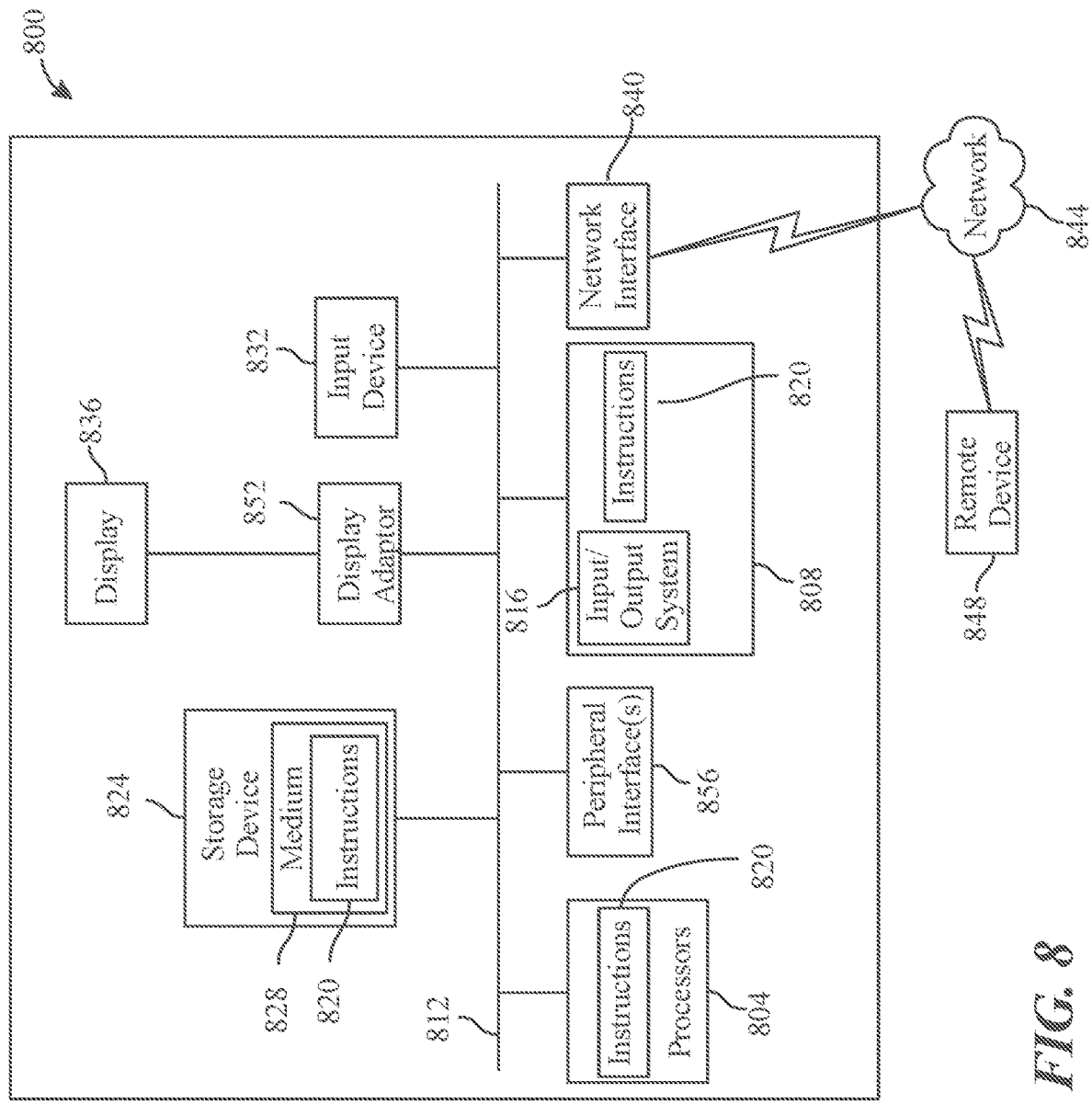
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A cryptographic agile bootloader for an upgradable secure computing environment, comprising:
   a computing device, wherein the cryptographic agile bootloader operates on the computing device and wherein the computing device is configured to execute a first bootloader, the computing device comprising:
   a secure root of trust, the secure root of trust configured to produce a first secret and a second secret; and
   a processor, the processor configured to:
   load a second bootloader, wherein the second bootloader is configured to generate a secret-specific public datum as a function of the second secret, wherein the secret-specific public datum further comprises a bootloader measurement, wherein the second secret is exclusively available to only the second bootloader and the secure root of trust;
   load the first bootloader, wherein the first bootloader is configured to sign the secret-specific public datum as a function of the first secret, wherein the first secret is exclusively available to only the first bootloader and the secure root of trust;
   determine the first bootloader is an outdated bootloader having deprecated cryptography;
   determine the second bootloader is a new bootloader, wherein the second bootloader includes a new bootloader certificate; and
   replace the first bootloader with the second bootloader according to the determination of the deprecated cryptography of the first bootloader.

2. The cryptographic agile bootloader of claim 1, wherein the second bootloader is further configured to:
   sign the secret-specific public datum as a function of a digital signature;
   verify, by a trusted verifier, the secret-specific datum as a function of local attestation; and
   relay the verification to the secure root as a function of the second secret.

3. The cryptographic agile bootloader of claim 2, wherein the secure root of trust is further configured to:
   verify the verification as a function of the second secret; and
   relay the verification to the first bootloader.

4. The cryptographic agile bootloader of claim 3, wherein the first bootloader is further configured to transmit the secret-specific public datum to a trusted verifier.

5. The cryptographic agile bootloader of claim 4, wherein the trusted verifier is further configured to:
   receive the signature from the first bootloader;
   verify the secret-specific public datum as a function of secret-specific verification datum associated with the first secret; and
   issue a certificate to the secret-specific public datum.

6. The cryptographic agile bootloader of claim 5, wherein the trusted verifier is further configured to communicate with a certificate authority, the certificate authority is configured to:

trust the secret-specific public datum;
issue a digital certificate of the secret-specific public datum; and
facilitate, to the trusted verifier, to trust the secret-specific public datum, wherein the secret-specific public datum further comprises an untrusted software.

7. The cryptographic agile bootloader of claim 6, wherein the digital certificate is received as a function of the local attestation, wherein the secure root of trust is further configured to:
generate, a ticket as a function of the signed secret-specific public datum;
transmit the ticket to the trusted verifier; and
receive the digital certificate as a function of the ticket.

8. The cryptographic agile bootloader of claim 1, wherein the bootloader measurement is generated as a function of a cryptographic protocol.

9. The cryptographic agile bootloader of claim 1, wherein the processor is further configured to replace the first bootloader with the second bootloader as a function of an upgrade window.

10. The cryptographic agile bootloader of claim 9, wherein the first bootloader is to be discarded into read-only memory as a function of the expiration of the upgrade window.

11. A method for a cryptographic agile bootloader for an upgradable secure computing environment of a computing device configured to execute a first bootloader, the method comprising:
producing, by a secure root of trust, a first secret and a second secret;
loading, by a processor, a second bootloader;
generating, by the second bootloader, a secret-specific public datum as a function of the second secret, wherein the secret-specific public datum further comprises a bootloader measurement, wherein the second secret is exclusively available to only the second bootloader and the secure root of trust;
loading, by the processor, the first bootloader, wherein the first secret is exclusively available to only the first bootloader and the secure root of trust;
signing, by the first bootloader, the secret-specific public datum as a function of the first secret;
determining, by the processor, the first bootloader is an outdated bootloader having deprecated cryptography;
determining, by the processor, the second bootloader is a new bootloader, wherein the second bootloader includes a new bootloader certificate; and
replacing the first bootloader with the second bootloader according to the determination of the deprecated cryptography of the first bootloader.

12. The method of claim 11, wherein the method further comprises:
signing, by the second bootloader, the secret-specific public datum as a function of a digital signature;
verifying, by a trusted verifier, the secret-specific datum as a function of local attestation; and
relaying the verification and its message authentication code to the secure root as a function of the second secret.

13. The method of claim 12, wherein method further comprises:
verifying, by the secure root of trust, the verification as a function of its message authentication code as a function of the second secret; and
relaying the verification to the first bootloader.

14. The method of claim 13, wherein method further comprises transmitting the secret-specific public datum to a trusted verifier.

15. The method of claim 14, wherein the method further comprises receiving, by the trusted verifier, the signature from the first bootloader;
verifying the secret-specific public datum as a function of the secret-specific public datum; and
issuing a certificate to the secret-specific public datum.

16. The method of claim 15, wherein trusted verifier is further configured to communicate with a certificate authority, the method further comprising:
trusting, by a certificate authority, the secret-specific public datum;
issuing a digital certificate of the secret-specific public datum; and
facilitating, to the trusted verifier, to trust the secret-specific public datum, wherein the secret-specific public datum further comprises an untrusted software.

17. The method of claim 16, wherein the digital certificate is received as a function of the local attestation, wherein the method further comprises:
generating, by the secure root of trust, a ticket as a function of the signed secret-specific public datum;
transmitting the ticket to the trusted verifier; and
receiving the digital certificate as a function of the ticket.

18. The method of claim 11, wherein generating the bootloader measurement further comprises generating the bootloader measurement as a function of a cryptographic protocol.

19. The method of claim 11, wherein replacing the first bootloader further comprises replacing the first bootloader with the second bootloader as a function of an upgrade window.

20. The method of claim 19, wherein the method further comprises discarding the first bootloader into read-only memory as a function of the expiration of the upgrade window.

* * * * *